United States Patent [19]
Inbar

[11] Patent Number: 5,963,276
[45] Date of Patent: Oct. 5, 1999

[54] BACK PROJECTION TRANSPARENCY VIEWER WITH OVERLAPPING PIXELS

[75] Inventor: Dan Inbar, Haifa, Israel

[73] Assignee: Smartlight Ltd., Nesher, Israel

[21] Appl. No.: 08/781,576

[22] Filed: Jan. 9, 1997

[51] Int. Cl.⁶ .......................... G02F 1/1335; G03B 21/26; G09G 5/00; G06K 9/62
[52] U.S. Cl. ..................................... 349/5; 353/35; 345/1; 345/903; 382/128; 382/132
[58] Field of Search ........................... 349/5; 345/1, 903; 345/7; 353/35; 382/128, 132

[56] References Cited

U.S. PATENT DOCUMENTS

| | | | |
|---|---|---|---|
| 1,988,654 | 1/1935 | Haag . | |
| 2,436,162 | 2/1948 | Cadenas | 40/361 |
| 2,516,270 | 7/1950 | Swain | 40/361 |
| 2,754,605 | 7/1956 | Berkeley | 40/471 |
| 3,246,412 | 4/1966 | Sommerhoff | 40/361 |
| 3,249,691 | 5/1966 | Bigelow . | |
| 3,322,485 | 5/1967 | Williams | 349/143 |
| 3,492,486 | 1/1970 | Bischoff et al. | 250/204 |
| 3,714,413 | 1/1973 | Craig | 362/19 |
| 3,953,764 | 4/1976 | Miller et al. | 315/386 |

(List continued on next page.)

FOREIGN PATENT DOCUMENTS

| | | |
|---|---|---|
| 0035382 | 9/1981 | European Pat. Off. . |
| 0165548 | 12/1985 | European Pat. Off. . |
| 0253379 | 1/1988 | European Pat. Off. . |
| 0352101 | 1/1990 | European Pat. Off. . |
| 0412757 | 2/1991 | European Pat. Off. . |
| 0436267 | 7/1991 | European Pat. Off. . |
| 0627644 | 12/1994 | European Pat. Off. . |
| 2559923 | 8/1985 | France . |
| 1961126 | 7/1970 | Germany . |
| 3331762 | 3/1985 | Germany . |

(List continued on next page.)

OTHER PUBLICATIONS

A European Search Report.
Patent Abstracts of Japan, vol. 10, No. 206 (P–478).
Patent Abstracts of Japan, vol. 17, No. 387 (P–1576).
Patent Abstracts of Japan, vol. 16, No. 562 (P–1456).
J. Nehring, IEEE Transactions on Electron Devices, vol. 26, No. 5, May 1979, New York, US, pp. 795–802, "Ultimate Limits for Matrix Addressing . . . ".
T.N. Ruckmongathan, Conference Record of the 1988 International Display Research Conference, Oct. 1988, pp. 80–85, "A Generalized Addressing Technique for RMS Responding Matrix LCD".
H. Hamada, SID 1992, pp. 269–272, "Brightness Enhancement of an LCD Projector by a Plana Mcrolens Array".
IBM Technical Disclosure Bulletin, vol. 33, No. 9, Feb. 1991, New York, US, pp. 261–262, "High Efficiency Backlight for LCD".
Patent Abstract of Japan, vol. 13, No. 314 (P899).
Patent Abstract of Japan, vol. 17, No. 464 (P1599).
Jameson et al., "Visual Psychophysics", pp. VII, VIII, 43–49,54 and 78–101, 1972.
E. Kaneko, "Liquid Crystal TV Displays: Principles and Applications of Liquid Crystal Displays", pp. 77–137.
T.N. Ruckmongathan et al., Japan Display 1992, "S3–4 New Addressing Technique for Fast Responding STN LCDs", pp. 65–68.
K. Tarumi et al. Japan Display 1992, "S15–5 On the Relationship between the Material Parameters and the Switching Dynamics in Twisted Nematic Liquid Crystals", pp. 587–590.

(List continued on next page.)

*Primary Examiner*—William L. Sikes
*Assistant Examiner*—Kari M. Horney
*Attorney, Agent, or Firm*—Greenblum & Bernstein, P.L.C.

[57] ABSTRACT

A method of transparency viewing, including, placing the transparency at a viewing surface, forming a light pattern and projecting the light pattern to back-illuminate the transparency. Preferably, the light pattern is formed by spatially modulating a beam of light using a plurality of light-valves.

12 Claims, 11 Drawing Sheets

U.S. PATENT DOCUMENTS

| | | | |
|---|---|---|---|
| 4,004,360 | 1/1977 | Hammond | 40/361 |
| 4,118,654 | 10/1978 | Ohta et al. | 40/361 |
| 4,335,936 | 6/1982 | Nonomura et al. | 349/82 |
| 4,368,467 | 1/1983 | Unotoro et al. | 345/1 |
| 4,373,280 | 2/1983 | Armfield, III | 40/367 |
| 4,378,557 | 3/1983 | Murata | 345/94 |
| 4,403,832 | 9/1983 | Tanaka et al. | 349/83 |
| 4,448,490 | 5/1984 | Shibuya et al. | 349/82 |
| 4,454,904 | 6/1984 | Oxman | 160/332 |
| 4,510,708 | 4/1985 | Pokrinchak | 40/361 |
| 4,637,150 | 1/1987 | Geluk | 40/361 |
| 4,707,080 | 11/1987 | Fergason | 349/89 |
| 4,775,918 | 10/1988 | Snyder | 362/18 |
| 4,799,083 | 1/1989 | Knodt | 40/518 |
| 4,833,542 | 5/1989 | Hara et al. | 348/383 |
| 4,850,675 | 7/1989 | Hatanaka et al. | 349/2 |
| 4,855,725 | 8/1989 | Fernandez | 345/173 |
| 4,859,037 | 8/1989 | Iwashita et al. | 349/97 |
| 4,901,155 | 2/1990 | Hara et al. | 348/383 |
| 4,908,876 | 3/1990 | DeForest et al. | 349/17 |
| 4,917,465 | 4/1990 | Conner et al. | 349/5 |
| 4,952,036 | 8/1990 | Gulick et al. | 349/82 |
| 4,966,441 | 10/1990 | Conner | 349/80 |
| 4,977,315 | 12/1990 | Purcell | 250/221 |
| 4,983,956 | 1/1991 | Salam | 345/109 |
| 5,124,818 | 6/1992 | Conner et al. | 349/75 |
| 5,155,608 | 10/1992 | Hatano | 349/76 |
| 5,159,363 | 10/1992 | Brauning | 353/122 |
| 5,206,673 | 4/1993 | Kawahara et al. | 353/98 |
| 5,313,726 | 5/1994 | Yaniv et al. | 40/361 |
| 5,333,072 | 7/1994 | Willett | 359/41 |
| 5,430,964 | 7/1995 | Inbar et al. | 40/361 |
| 5,432,624 | 7/1995 | Black | 349/73 |
| 5,491,332 | 2/1996 | Inbar et al. | 250/221 |

FOREIGN PATENT DOCUMENTS

| | | |
|---|---|---|
| 9010889 | 1/1991 | Germany . |
| 3933988 | 4/1991 | Germany . |
| 6484141 | 3/1989 | Japan . |
| 2050032 | 12/1980 | United Kingdom . |
| 2062930 | 5/1981 | United Kingdom . |
| 8903064 | 4/1989 | WIPO . |
| 9006537 | 6/1990 | WIPO . |
| 9110152 | 7/1991 | WIPO . |
| 9301564 | 1/1993 | WIPO . |
| 9514949 | 6/1995 | WIPO . |
| 9514950 | 6/1995 | WIPO . |
| 9516934 | 6/1995 | WIPO . |
| 9617269 | 6/1996 | WIPO . |
| 9701126 | 1/1997 | WIPO . |
| 9701127 | 1/1997 | WIPO . |

OTHER PUBLICATIONS

P.M. Alt et al., IEEE "Transactions on Electron Devices" vol. ED–21, No. 2, Feb. 1974, pp. 146–155.

D.P. Carmody PhD. et al., "Global and Segmented Search for Lung Nodules of Different Edge Gradients," Investigative Radiology, May–Jun. 1980. vol. 15. No. 3.

Andreas Abildgaard, MD. et al., "Increasing Contrast When Viewing Radiographic Images", Radiology, vol. 185, No. 2.

Werner E. Haas, *Liquid Crystal Display Research*: The First Fifteen Years, Vol. Cryst. and Liq. Crys, vol. 94, pp. 1–31 (1983).

*Liquid Crystals, Nature's Delicate Phase of Matter,* by Peter J. Collings, Princeton University Press, 1990, Chapter 2, pp. 24–34.

Stephen Balter, et al., *Radiographic Viewing Conditions,* published in the conference proceedings of "Application of Optical Instrumentation in Medicine, 2nd Seminar," SPIE, Nov. 29–30, 1973 pp. 225–227.

J. Blair Hartley, *Film Viewing 1996,* (Ro–B1 20, Yr. 2/67), pp. 96 and 97.

Gerd Rosenbusch, *Radiology in Medical Diagnostics,* 1994, p. 465.

Physiologishe Problems der Betrachtung des Rontgenbildes Psychological Problems in Viewing Radiograph) by Rainer Rohler, dated Feb. 1967, pp. 79 and 86–96 and English translation titled "Physiological Problems of Reading of Radiographs" (Ro–B1, 20 Yr. 2/67).

Coates, D. et al., "High Performance Wide–Bandwidth Reflective Cholesteric Polarizers",SID Applications Digest, 1990 pp. 67–70.

De Vaan et al., "Polarization Conversion System LCD Projection", Eurodisplay,1993, the Thirteenth International Display Research Conference, Strasburg, France, Aug. 31–Sep. 3, 1993, pp. 253–256.

Sobel et al., "Projection Displays", Seminar M–7, M–7.2–7.18, a lecture given at Bally's Hotel, Las Vegas, Nevada, May 14, 1990.

Kahn, "Electronic Projection Displays", Seminar M–4,, M–4/3–4/37, vol. 1, a lecture given at the Washington State Convention Center on May 17, 1993.

Shikama et al., "A Polarization Transforming Optics for High Luminance LCD Projector",Eurodisplay,1990, Sep. 25–27, 1990, Amsterdam, The Netherlands, The Tenth International Display Research Conference, pp. 64–67.

Bass, M. *Handbook of Optics, Fundamentals, Techniques & Design,* 2nd Edition, vol. I, McGraw–Hill,Inc. NY., pp. 42.94–42.108.

Burstyn, D., et al., "The Design of High–Efficiency High–Resolution Projectors with the Digital Micromirror Device", Digest of Technical Papers, SID International Symposium by the Society for Information Display, Digest of Technical Papers, vol. XXV, San Jose, California, Jun. 14–16, 1994, pp. 677–680.

Sampsell, J.B. "An Overview of the Performance Envelope of Digital–Micromirror–Device–Based Projection Display Systems", Digest of Technical Papers, SID International Symposium by the Society forInformation Display, May 1994, First Edition, pp. 669–672.

Weber M.F. Retroflecting Sheet Polarizer, SID Digest, 1993, Seattle, Washington, vol. XXIV, May 18–20, 1993, pp. 669–672.

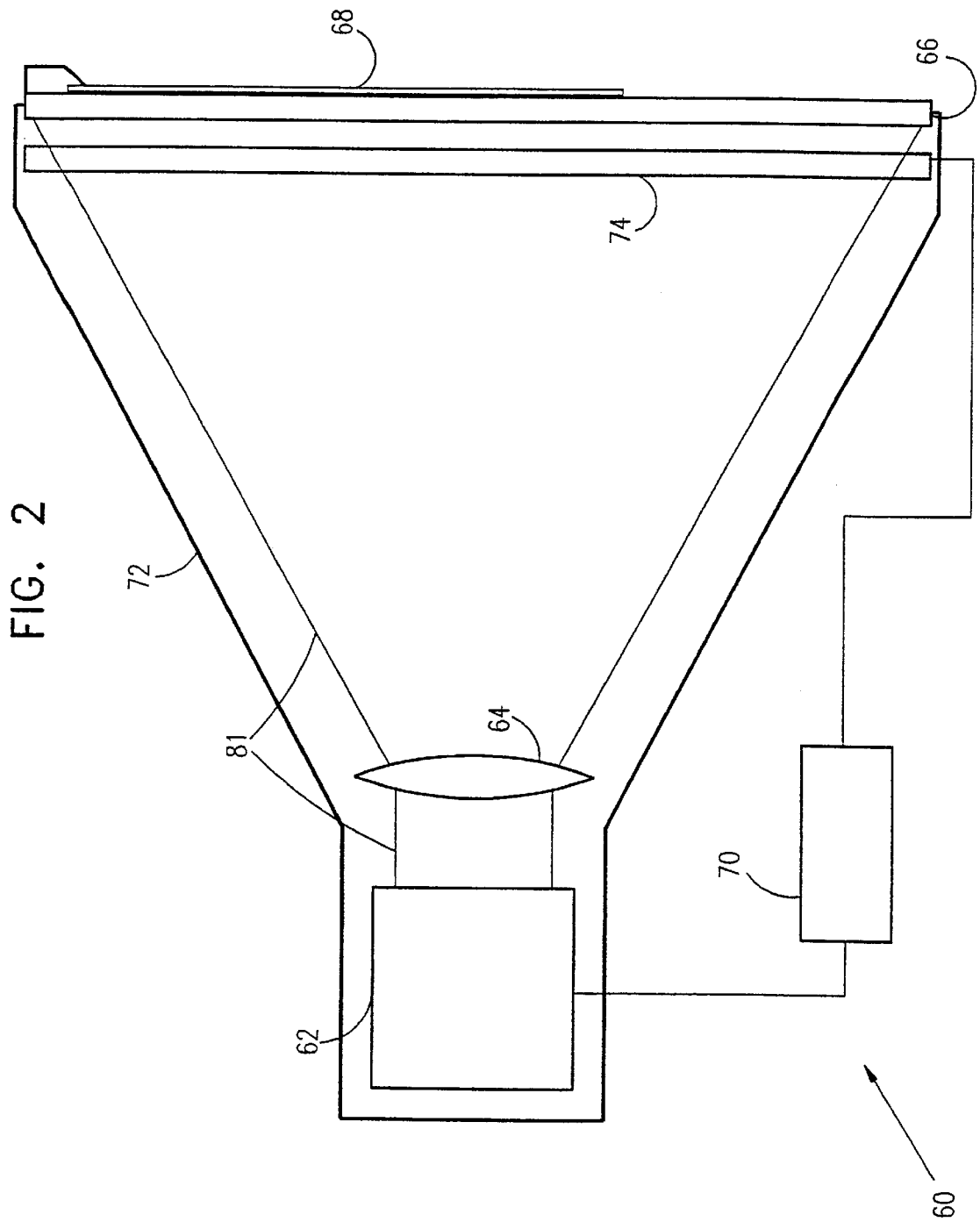

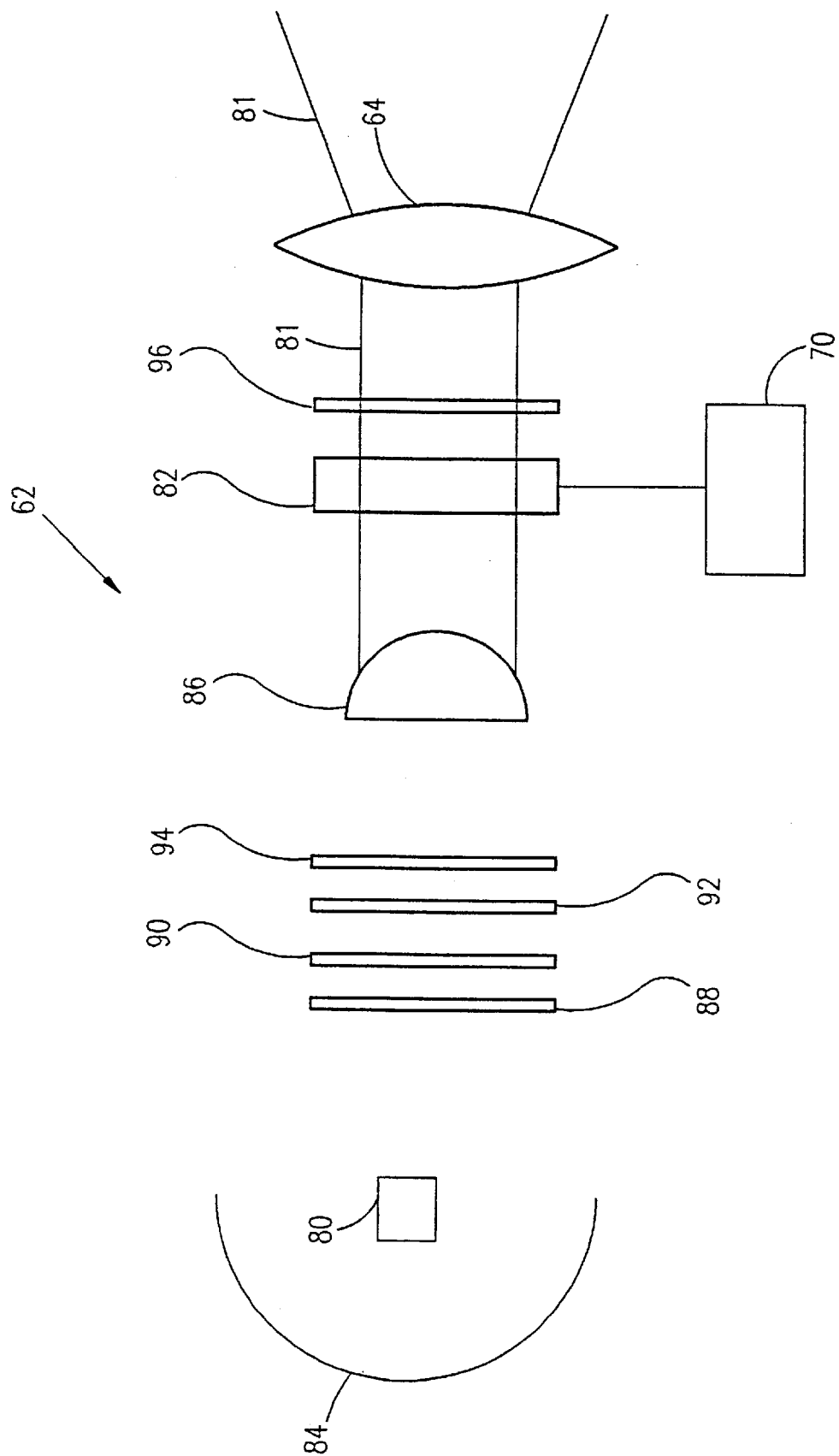

BACK PROJECTION TRANSPARENCY VIEWER WITH OVERLAPPING PIXELS

FIELD OF THE INVENTION

The present invention relates generally to a transparency viewing device and, more particularly, to apparatus for back-illuminating x-ray transparencies using a projector.

BACKGROUND OF THE INVENTION

Medical X-ray transparencies are usually examined by placing them over the viewing surface of a device commonly referred to as an illuminator, light-box or viewbox. Conventional illuminators normally comprise a box-like structure enclosing a plurality of fluorescent or incandescent lighting tubes behind a light diffusing plate which defines the display area. Generally, transparencies are retained on the surface of the viewing surface by pushing the upper edge of the transparencies under spring-loaded film-holder clips located along the top edge of the viewing surface.

Standard size illuminators have a viewing surface 17 inches high and 14 inches or multiples of 14 inches (i.e 28 inches or 56 inches) wide. Usually, each 14 inch width of viewing surface has its own fluorescent tunes and control switch. Such viewing surface enables the viewing of standard size X-ray films which measure up to 17 inches by 14 inches.

The sections of the viewing surface not covered by transparencies need not be illuminated. This eliminates unnecessary glare from areas outside the transparency. When transparencies smaller than 14 inches by 17 inches are to be examined, they are typically retained on the display area in the same manner as full size transparencies, for example, by suspending them by means of the film-holders along the top of the viewer. This leaves a portion of the display area surrounding the transparencies fully illuminated, with the resulting glare detracting from the visual perception of the person trying to study the transparency and assess the information it contains.

Often transparencies contain several very transparent areas, and, frequently, radiologists have to examine transparencies which are over-exposed (i.e., very dark) in some portions and under-exposed (i e., very light) in others. In these cases, considerable glare emanates though areas of the transparencies themselves. Moreover, in many instances, the region of the display area which is of highest interest to the viewer is site dense. Thus, the ability to discern details in the region may be limited by glare from the surrounding, less dense areas.

Attempts have been made in the past to provide viewing devices for X-ray transparencies which shield the eyes of the observer from light other than that passing through the transparencies. These viewing devices obscure light from portions of the transparencies not of interest or from outside the transparencies and/or reduce the contrast within transparencies.

U.S. Pat. No. 1,998,654 to Haag discloses a light box which incorporates two manually movable curtains for masking all of the light-transmitting surfaces of a diffuser up to the edges of a transparency.

U.S. Pat. No. 2,436,162 to Cadenas discloses an X-ray viewer having a masking arrangement incorporating a plurality of hinge—connected opaque masks which may be manually pivoted relative to each other to expose all or only selected parts of an X-ray transparency.

U.S. Pat. No. 4,004,360 to Hammond is directed to a self-masking viewing device which purports to automatically obscure areas of the viewing screen not occupied by the X-ray transparency. In the disclosed device, the screen is provided with a multiplicity of holes which may be selectively blocked by shutters or opened for the passage of light. The interior of the device is connected to a vacuum source which functions to hold the film against the front surface of the device.

The vacuum functions, in addition, to close the shutters connected with those holes not covered by the transparencies, so that passage of light through such holes is prevented. Air cannot pass through those holes in registry with the transparencies and, thus, the shutters associated with the covered holes remain open for the passage of light. The device described is unsuitable for critical inspection of X-ray transparencies since the presence of holes and shutters in the areas in registry with the transparencies creates a pattern behind the transparencies which interferes with the ability to accurately road them.

U.S. Pat. No. 4,373,280 to Armfield discloses an X-ray viewing plate having a cross bar for supporting transparencies at a central portion of the screen. A Series of shades is provided which may be manually activated to obscure selected parts of the illuminated surface.

U.S. Pat. No. 4,510,708 to Porkinchack discloses an X-ray viewing device which includes a series of masks on an elongated scroll. In a specific embodiment of the invention, the scroll is moved by a motor on a pair of feed rolls. The masks are sized to correspond with stock sizes of X-ray transparencies. The apparatus has a dimensional sensing mechanism which aligns a selected mask with a positioned transparency automatically in accordance with the sensed dimension. The transparencies are inserted into a filmholder. The widthwise sensing function is preformed by a series of levers or fingers positioned to engage an edge of the film.

U.S. Pat. No. 4,637,150 to Geluk describes a system in which a cathode ray tube (CRT) is used as a light source and the light emitted by this source is modulated in accordance with the stored density of a transparency. This system is impractical due to the limited sizes and associated light intensity outputs of CRTs for this type of illuminator.

U.S. Pat. No. 4,908,876 to Deforest et al., describes, inter alia, a transparency viewer using projection lens to project a light source for back-illuminating a transparency.

U.S. Pat. No. 5,313,726 to Yaniv et al., describes a transparency viewer in which a light source, mounted in a reflecting housing, is used to back-illuminate a transparency.

German Patent Application DE 33 31 762 A1 describes an array type electrochromatic illuminator in which backlighting selectively illuminates portions of a viewing surface in response to the application of voltage to horizontal and vertical strip conductors on opposite faces of an electrochromatic material placed between the source of illumination and the viewing surface.

U.S. patent application Ser. No. 07/861,982, titled "Self Masking Transparency Viewing Apparatus" by Dan Inbar and Giora Taltsch, now U.S. Pat. No. No. 5,430,964, granted Jul. 11, 1995, and U.S. patent application Ser. No. 08/175, 372, titled "Position Sensing Display Device" by Dan Inbar and Giora Teltsch, filed Mar. 31, 1994 and corresponding PCT Publications WO 91/10152, filed Dec. 28, 1990, and WO 93/01564, filed Jul. 11, 1991, the disclosures of which are incorporated herein by reference, disclose self-masking transparency viewing apparatus having a mask-pattern generating device which may be an electrically-controlled Liquid Crystal Array (LCA). In addition, there is provided a transparency detection means, such as optical sensors or micro switches. The optical sensors recognize optical properties, for example, attenuation of transparencies mounted and of unobstructed areas of the display area. In some embodiments the detection means determines the existence and locations of transparencies on the display surface, as well as the location of subimages within the transparencies. The detection data is transferred to a system control unit which drives the LCA to produce a complementary masking pattern in conformity with the displayed transparencies, masking other portions of the display area.

Back-illuminating a large LCA using direct illumination by a bank of fluorescent lamps, as shown in some prior art systems, has several drawbacks:

(a) the intensity of the back-illumination is typically limited to intensity levels at which the human eye is less sensitive to low-contrast details, due to limited area behind the display surface which is available for packing fluorescent lamps;

(b) at least two LCA layers are required to provide good contrast at acceptable viewing angles, since large LCAs typically have low contrasts (especially at large viewing angles); the plurality of LCAs reduces the intensity of the back-illumination still further;

(c) spatial uniformity is difficult to maintain when using a plurality of fluorescent lamps;

(d) producing large, high-contrast, LCAs, in particular STN (super twisted nematic) and PDLCA (polymer dispersed liquid crystal array), at acceptable yields and cost is difficult;

e) producing very large LCAs, such as 14"×17" is not known in the art, thus, a plurality of LCAs must be used to cover a large display size, such as 14"×17", resulting in seams or dead spaces between the LCAs: seams are a drawback especially for horizontal mounting of large transparency sizes, such as 14"×17", on viewboxes optimized for vertical mounting of 14×17" transparencies;

(f) large LCAs are very expensive;

(g) certain types of LCAs, such as active matrix LCAs, that provide high contrast and allow for high complexity masking are unavailable in large sizes;

(h) cooling the LCAs in prior systems is difficult; and (i) light recycling is complex to complement and typically inefficient in systems which use large LCAs.

Rear projection displays of images are well known. In particular, video monitors using an LCA projector are known. Generally, an LCA containing an image modulates an intense collimated light source to produce an image carrying beam. The image carrying beam Is then projected, using a lens, onto the back of a display surface. Such a system is described in the lecture notes of "Projection Displays", a lecture given by Alan Sobel at Bally's hotel in Las Vegas, Nev., on May 14, 1990 for the Society for Information Display and in the lecture notes of "Electronic Projection Displays", a lecture given by Frederic J. Kahn at the Washington State Convention Center, Seattle, Wash. on May 17, 1993, the disclosures of both of which are incorporated herein by reference.

It is known in the art that, when modulating a light beam using an LCA, the light beam is attenuated to a significant degree. This attenuation is due to the fact that LCAs modulate linearly polarized light and transforming regular light into linearly polarized light usually involves a loss of intensity of 50% or more. Typically, the polarizer absorbs the non-transmitted light, resulting in significant heat generation and possible degradation of the polarizer or LC (liquid crystal) material. In recent year, several types of relatively low-loss linear polarizers has been developed.

FIG. 1A shows a first such polarizer, as described In "A Polarization Transforming Optics for High Luminance LCA Projector", by S. Shikamn, E. Toide and H. Kondo, in the proceedings of EURODISPLAY '90, the tenth international display research conference, the disclosure of which is incorporated herein by reference. A unpolarized light beam 20 is split by a polarizing beam splitter 22 into a first polarized light beam 28 and a second polarized light beam 34 which have perpendicular polarization axes. Beam 34 is reflected by a mirror 24 to pass through a half-wave plate 26 which rotates the polarization axis of beam 34 by 90° to produce a beam 30. The polarization axes of beam 30 and beam 28 are parallel to each other and to the polarization axis of an input (to an LCA) polarizer 32. Thus, substantially all of the energy of light beam 20 passes through polarizer 32. Beam 30 is typically refracted to be parallel to beam 30 by additional optical elements (not shown).

FIG. 1B shows a second example of a low-loss polarizer, as described in "Polarization Conversion System LCD Projection", by A. J. S. M. De Vaan, A. H. J. Van De Brandt, R. A. M. Karsmakexs, M. V. C. Stroomer and W. A. G. Timmers in the conference proceedings of EURODISPLAY '93, the 13th international display research conference, the disclosure of which is incorporated herein by reference. A polarizer 42 generally comprises a first prism portion 40 and a second prism portion 44 which are separated by thin birefringent layer 46, such as a birefringent adhesive. A light beam 48 entering prism 40 is refracted towards layer 46, which separates beam 48 into a first polarized beam 50, which is reflected back into prism 40, and into a second polarized beam 52, which is transmitted into prism 44. Beams 50 and 52 have perpendicular polarization axes. When beam 50 (and 52) exit prisms 40 (and 44), it is refracted back by an angle equal to its entrance angle. The polarization axis of beam 52 is rotated 90° by a half-wave plate 54 located on or near the exit of prism 44. Thus, beam 52 and beam 50 have parallel polarization axes.

SUMMARY OF THE INVENTION

In a preferred embodiment of the present invention, a display surface with a transparency thereon is back-illuminated with a protected pattern. The back-illumination is masked by a spatial modulator, preferably using an LCA, so that only portions of the display covered by the transparency or a region of interest thereof are back-illuminated. Preferably, the display surface is a partially diffusing screen.

Back-illuminating with a projected pattern, in accordance with the present invention, can afford several advantages. A first advantage is that the light intensity of the back-illumination is not significantly limited by the space behind the display surface. In a direct back-illumination system, the light intensity is limited by the number and size of lamps which can be placed behind the surface and by considerations of heat dissipation and spatial uniformity of the display surface. When back-illuminating with fluorescent lamps, the light intensities reached are usually sub-optimal. However, with a projector, high-temperature, high intensity light sources, such as metal-halide lamps can be used to generate any required amount of light. This light is then projected onto the display surface.

Cooling the light source and insulating the display surface (and transparencies and operators) from excess heat is simpler, in a preferred embodiment of the present invention, because the heat is emitted from a centralized location, which can be relatively far away from the display surface. In particular, cooling a small LCA is simpler and more efficient than cooling a large one.

Providing spatial uniformity when using direct lighting with multiple light sources is problematic. Each portion of the display surface is back-illuminated by a different light source and the relative intensities and color of these light sources changes as the light sources age. In projectors spatial uniformity is simpler to achieve, since the projector can mix the light from one or more light sources so that each location on the display surface receives substantially the same illumination. In particular, if only one light source is used, the spatial uniformity is stable over time;

Another advantage of embodiments of the present invention, relates to the type of at least some light sources used to back-illuminate the display surface. Typically fluorescent lamps are used in the prior art because they have relatively consultant intensities over their length, are relatively efficient and are available in a wide range of colors spectrums, such as near-white and In spectrums which are pre-corrected for LCA absorption. In a projector, the variety of usable lamps is much wider. In particular, lamps which warm-up quickly, more efficient lamps and clusters of monochrome lamps are all suitable for the present invention. Furthermore, lamps which compensate for the spectral transmission spectrum of the LCAs may also be employed.

Other advantages of at least some embodiments of the present invention, relate to the LCA used for masking the transparency or region of interest. In a projector, a relatively small LCA can mask back-illumination for a very large display surface. There are commercially available high contrast and high-resolution small LCAs, such as, "Super Twist Nematic," ferro-electric and active matrix types, which cannot be economically produced in the sizes required for a direct back-illumination viewbox for medical transparencies. As a result, fever layers of LCAs are required to achieve the same contrast ratio between the bright and the dark portions of display surface. In particular, a single LCA may be sufficient for masking projected back-illumination for a transparency. Since the back-illumination is less attenuated by LCA layers, lower source intensities are required, and less heat is dissipated.

Another advantage relating to small, high contrast and high resolution LCAs is the possibility of generating more complex masking patterns than those described in PCT publication WO95/14949, titled "Transparency Viewing Device Comprising Passive Matrix LCD", by Dan Inbar, Hanan Wolf and Ben Zion Levy, published Jun. 1, 1995, PCT application publication W095/14950, titled "Viewing Apparatus and Work Station", by Dan Inbar and Hanan Wolf, published Jun. 1, 1995 and U.S. application Ser. No. 08/348,959, titled "Improved Display Device", to Dan Inbar, Giora Teltsch, Ben Zion Levy and Eran Shaffir, filed Nov. 28, 1994. Yet another advantage relating to small, high resolution and high contrast LCAs is the possibility of generating gray-level masking without compromising the overall contrast-ratio of the LCA, as in some prior art systems.

Use of a projected cone beam to illuminate the transparency reduces contrast-degradation for off-axis viewing as compared to the prior art, especially if the transparency is mounted on a partially diffusing surface.

A further advantage is that a more uniform masking pattern is achieved than that of some prior art systems. The relatively long distance between the LCAs and the display surface, together with the small aberrations typically found in the projectors result in a diffusion effect. Patterns arising from non-active portions of the LCAs are erased by the diffusion effect, without the use of a diffuser. Alternatively or additionally, the projector is calibrated to be slightly out of focus, while retaining a sufficient spatial resolution, such as 3–10 mm. As a result, transparencies can be viewed through a relatively wide viewing angle with a uniformly high contrast masking pattern.

Another advantage of the present invention is that the size of the LCA Is not a limiting factor in providing a "seam-free" display area. In prior art systems for 14"×17" displays a number of LCAs were required to cover the display surface. The seams or dead spaces between such LCAs had to be compensated for.

The system of the present invention is less expensive than those of the prior art, due, inter alia, to the use of smaller LCAs and fewer lamps. Furthermore, it is very practical to recycle light from masked areas when the masking system is small.

In one preferred embodiment of the invention, a reflective LCA is used for generating masking patterns. A reflective LCA include an LCA between two polarizers and a mirror abutting one of the polarizers. One advantage of a reflective type LCA is that twice the contrast of a single LCA can be achieved using a reflective LCA. Another advantage of a reflective LCA is the wide viewing angle achievable in such an LCA. A reflective LCA is the covalent of an LCA abutting a mirror image of the LCA. As a result, light whose polarization is rotated in one direction by the LCA before it reaches the reflective portion is rotated back to its original polarization by the LCA after the reflectance.

One particular aspect of using a reflective LCA for transparency viewing rather than for projection of images is in the amount of overlap between neighboring pixels. In using a reflective LCA, light is directed to the LCA at non-normal angle. As a result, light which enters the LCA at one pixel may exit the LCA at another pixel. One aim of designing projection TVs using reflective LCAs is to minimize this overlap. It is believed that reflective LCAs are generally unsuitable for image projection for this reason. In a transparency viewing apparatus, a certain amount of overlap is desirable.

One example of a desired overlap between pixels is in masking mammograms as described in PCT publication WO96/17269. Unlike most other x-ray transparencies, in a mammogram there is important visual information right up to the edge of the transparency (on the side of the chest). Most other x-ray transparencies have a border of unused or uninteresting space at their perimeter. When viewing a regular x-ray transparency on a viewbox, a mask generator in the viewbox is usually set up to mask all of the uncovered display surface and a part of the border of the transparency. The overlap between the mask and the border ensures that there will be no leakage of light between the transparency and the mask. In a mammogram, this overlap is not desirable, since medically important portions of the Image might also be masked. Instead, a graded density mask is generated between the edge of the transparency and the uncovered display surface. Thus, if there is any error in placement of the mask, the image portion of the transparency will not be completely masked and uncovered display portions will not be completely unmasked.

One method of generating a mask with a graded density edge is by allowing overlap between neighboring pixels. Preferably this overlap is above 30%, more preferably, this overlap is above 50% and most preferably, this overlap is above 80%. Note that for an overlap above 100%, a pixel value can affect the light intensity at a pixel whose center is two pixels away. Preferably, the amount of overlap is symmetrical in all directions, such that the overlap to the left and the overlap to the right are substantially equal. Alternatively, the masking generator is driven to provide substantially equivalent borders on masking patterns irrespective of the border orientation.

Pixel overlap is also reflected in the system resolution. In an image display, a minimum pixel size is desirable. The smaller the pixel, the higher the image definition and picture quality (within reasonable limits). In a transparency viewbox, one of the most important requirements is the absence of artifacts, which might distort the interpretation of the transparency. Thus, the masking pattern is usually smoothed, such as by a diffuser at a face plate of the viewbox. Another limitation on the maximum desirable resolution of a viewbox is created by the possibility of a parallax between the masking pattern and the transparency. There is always some gap between the transparency and the masking pattern. If the faceplate is not diffusive, the gap is equal to the optical distance between the transparency, the mask generator and an observer. If the faceplate is diffusing, the gap is equal to the distance between the transparency and the faceplate. This distance is almost never zero, since the transparency tends to curl up at the bottom. If the observer stands directly in front of the transparency, this is very little parallax effect. However, if the observer views the transparency from an angle, there may be a considerable amount of parallax. For this reason, very high definition borders are generally not desirable in a transparency viewbox.

Another aspect of the present invention relates to using the plurality of light valves for image processing as well as masking. In one preferred embodiment of the invention, a first portion of an LCA is driven as a mask and a second portion of the LCA is driven as an image-processing light modulator, for example, as an unsharp masking device. In another preferred embodiment of the invention, a first LCA, preferably an active LCA located before the projection lens, is driven as an image processor and a second LCA, preferably a passive LCA located near a display surface, is driven as a mask.

There is thus provided in accordance with a preferred embodiment of the present invention a method of transparency viewing including placing the transparency at a viewing surface and back-illuminating the transparency with a projected light source.

In a preferred embodiment of the present invention, back-illuminating includes projecting a masking pattern toward the viewing surface. Preferably, the masking light pattern is formed by spatially modulating a beam of light using a plurality of light-valves. Preferably, a second plurality of light-valves also spatially modulates the beam of light. In a preferred embodiment of the present invention, the masking pattern includes dark portions and bright portions and spatial modulating includes redirecting at least a portion of the beam of light from dark portions of the pattern to bright portions of the pattern. Preferably, redirecting includes scattering a portion of the beam from the plurality of light-valves and redirecting the scattered portion back toward the light-valve.

Additionally or alternatively, modulating includes reflecting a portion of the beam of light from the dark portions of the pattern toward a third location and reflecting at least some of the portion of the beam of light from the third location toward the plurality of light-valves.

In a preferred embodiment of the invention, spatially modulating Includes spatially modulating the beam of light to correct for Intensity variations caused by the projection.

Preferably, spatially modulating includes converting the polarization of the beam of light using a low-loss polarizer.

In a preferred embodiment of the invention, the beam of light is spatially modulated by reflecting it off a plurality of reflectance type light-valves. Additionally or alternatively, the beam of light is spatially modulated using an LCA.

Preferably, each of the plurality of light-valves is driven in an independent manner.

Preferably, the projection includes projecting the pattern onto the viewing surface out-of-focus.

There is also provided with accordance to another preferred embodiment of the present invention a viewbox, including, a display surface adapted for mounting a transparency thereon and a projector which back-illuminates the display surface with projected light. Preferably, the display surface is diffusing. Preferably, the viewbox includes a face light-valve located adjacent the display surface.

In a preferred embodiment of the present Invention, the projected light is patterned Preferably, the projector includes a plurality of light-valves which pattern the projected light. Further preferably, the viewbox includes a second plurality of light-valves, arranged in tandem with the plurality of light valves in the projector. Alternatively, the projected light is substantially homogeneous.

In a further preferred embodiment, the light pattern includes dark portions and bright portions and the viewbox including a light recycling apparatus which blocks light from passing through the plurality of light-valves at locations corresponding to the dark portions and redirects the blocked light to portions of the plurality of light-valves which correspond to the bright portions. Preferably, the light recycling apparatus includes light reflecting shutters selectably positionable adjacent the plurality of light-valves.

Additionally or alternatively, the plurality of light-valves in the projector backscatter light. Preferably, the viewbox includes means for redirecting light scattered by the plurality of light-valves back toward the plurality of light-valves. Alternatively or additionally, the viewbox includes a reflecting surface which redirects light scattered by the plurality of light-valves back toward the plurality of light-valves. Preferably, the viewbox includes means for recycling light.

Preferably, the projector further includes a collimator adjacent the plurality of light-valves, which collimates the light exiting the light-valves.

In a preferred embodiment of the invention, the projector further includes a light source and an infra red blocking filter situated between the light source and the plurality of light-valves comprised in the projector.

Preferably, the plurality of light-valves includes a liquid crystal array (LCA), preferably, a super twisted nematic LCA or a polymeric dispersion liquid crystal array. Preferably, the LCA includes an active matrix LCA. Additionally or alternatively, the plurality of light-valves includes a plurality of reflectance type light-valves, preferably, a digital micro-mirror device.

Preferably, the plurality of light-valves include a low-loss polarizer, preferably, a retro-reflector sheet polarizer, which polarizes light entering the plurality of light-valves. Preferably, the viewbox includes a second polarizer for polarizing light entering the plurality of light-valves.

In a preferred embodiment of the invention, the projector includes a mechanical shutter system which modulates the back-illumination.

Preferably, the viewbox includes a neutral density filter which corrects intensity non-uniformities on the display surface. Additionally or alternatively, the viewbox preferably includes a chromatic filter which adjusts the color spectrum of the light back-illuminating the transparency.

In a preferred embodiment of the invention, the viewbox includes a mirror which reflects the light beam towards the display surface.

In another preferred embodiment of the invention, the viewbox includes a camera which views the display surface. Preferably, the camera is located on the inside of the viewbox.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention.

FIG. 2 is a schematic cross-sectional side view of a viewbox according to one preferred embodiment of the present invention;

FIG. 3 is a schematic side view of a projection subsystem of a viewbox according to a preferred embodiment of the invention, such as can be used In the embodiment of FIG. 2;

DESCRIPTION OF THE PREFERRED EMBODIMENTS OF THE INVENTION

Figure 1A:
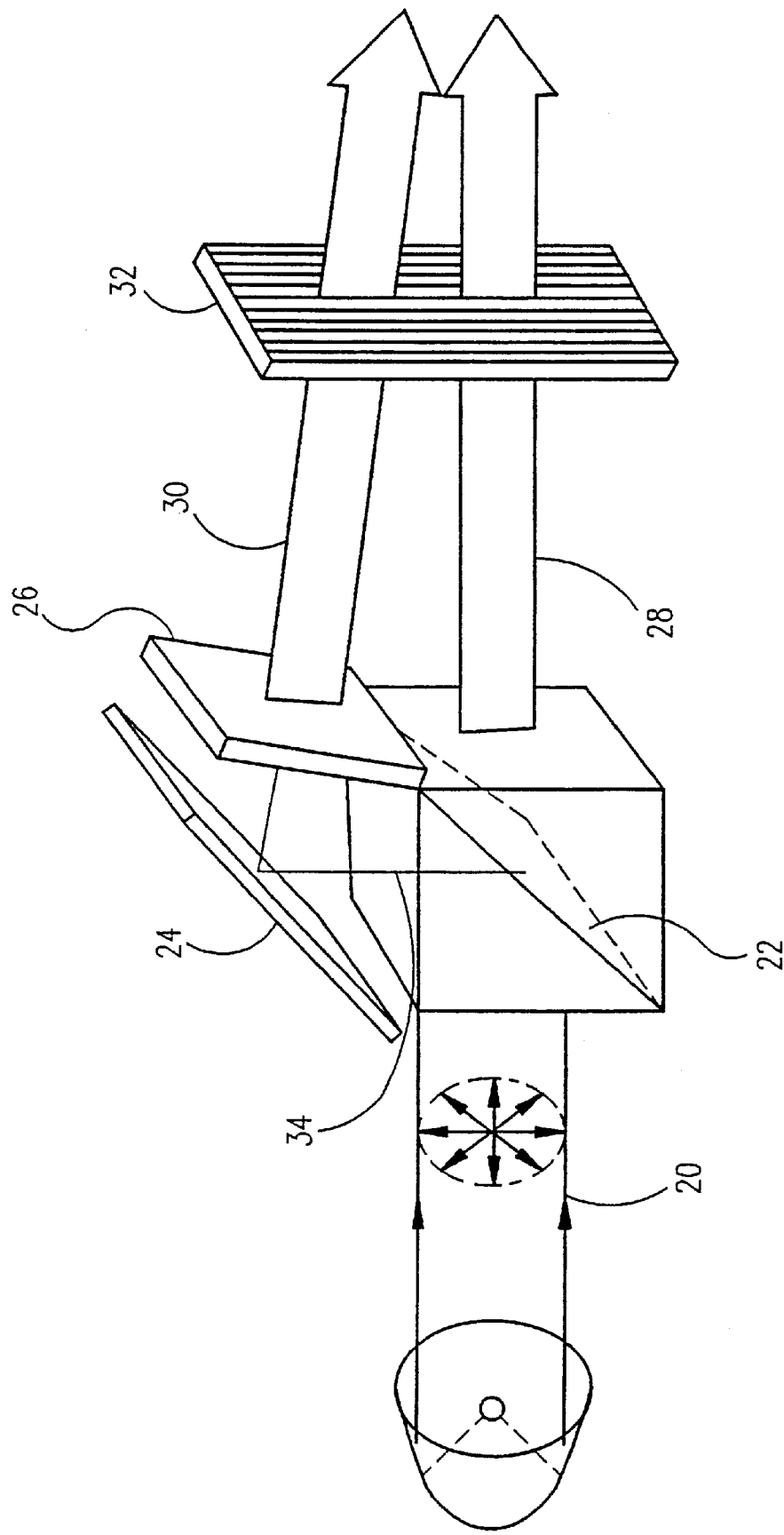
FIG. 1A is an illustration of a first known example of a low-loss polarizer.

FIG. 2 is a schematic side view of a viewbox 60 according to a preferred embodiment of the present invention. Viewbox 60 generally comprises a projection subsystem 62 which uses projection optics 64 to project a patterned light beam 81 onto the back of a display surface 66. Display surface 66 preferably comprises a diffuser. A transparency 68, which is mounted on display surface 66, is back-illuminated by patterned light 81. The pattern of patterned light 81 is preferably controlled by a controller 70 to back-illuminate only portions of display surface 66 which are covered by transparency 68 or regions of interest thereon. Thus, an operator viewing transparency 68 is not dazzled by light from other parts of the display surface. Optionally, an LCA 74, also controlled by controller 70, is used to father modulate the pattern of light beam 81 before light 81 reaches display surface 66 to enhance the contrast of the pattern in light beam 81. Preferably, patterned light 81 is formed by masking a beam of light using an LCA within protection subsystem 62. Some preferred methods of using an LCA to modulate patterned light for back-illuminating transparencies are described below.

Viewbox 60 is preferably encased in a casing 72 having light-absorbing inner walls. Thus, ambient light which enters viewbox 60 through display surface 66 is absorbed in the casing and does not reduce the contrast between back-illuminated portions and non-back-illuminated portions of display surface 66.

FIG. 3 is a schematic side view of a preferred embodiment of projection subsystem 62. A light source 80, preferably backed by a concentration reflector 84, generates intense light. The light is converted into a parallel beam of light by condenser optics 86 for back-illuminating an LCA 82. Light transmitted through LCA 82 forms patterned light 81 which is projected by optics 64 onto display 66, as described above. If LCA 82 has a maximal contrast for light passing through it at an angle other than perpendicular to its face, it is preferably oriented at that angle with respect to the light from condenser optics 86.

Several light modifying elements are preferably placed in the light beam between light source So and LCA 82. An infra red (IR) filter 88 reduces the amount of IR in the spectrum of the light, insulating heat-sensitive elements, such as LCAs. A chromatic filter 90, adjusts the spectrum of light source 80, if necessary, to provide the required chromaticity to illuminate the transparency, taking into account:

(a) the transmission spectra of the LCAs;

(b) the emission spectrum of light source 80; and (c) other optical elements in viewbox 60.

Figure 1B:
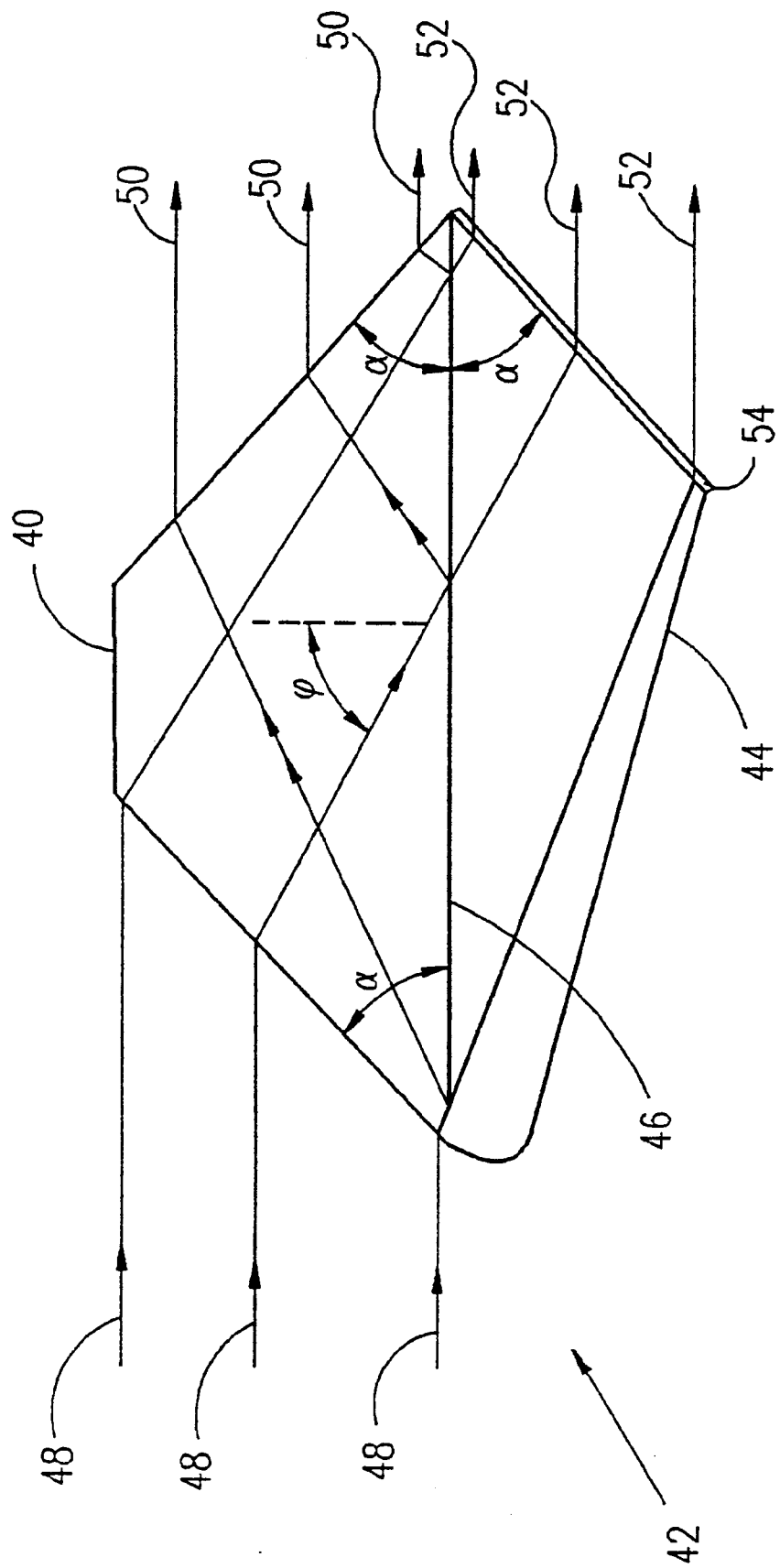
FIG. 1B is an illustration of a second known example of a low-loss polarizer.

Preferably, an integrator 92 serves to smooth the light beam so that it is spatially uniform in intensity. Such an integrator is shown in "Polarization Conversion System LCD Projection", cited above and shown in FIG. 1B. Alternatively or additionally, other optical or diffusing means are used to generate a spatially uniform light beam or to form a non-uniform beam, which is corrected for projection distortions. Alternatively or additionally, the non-uniformity of light source 80 is corrected by concentrator reflector 84, which forms multiple images of light source 80.

LCA 82 is controlled by controller 70 to convert the light beam into patterned light beam 81. LCA 82, In conjunction with a first polarizer 94 and a second polarizer 96 preferably comprise a light valve matrix, which is controllable by controller 70. When a plurality of valves are open in accordance with a pattern, the pattern is imposed on a beam of light passing through LCA 82 to form patterned light 81.

Methods for generating such patterns are shown in the aforementioned PCT publications WO95/14949 and WO95/14950 and in the aforementioned U.S. patent application Ser. No. 08/348,959. Other details relating to viewboxes are disclosed in Israel patent application serial number 116,252, filed Dec. 4, 1995, by applicant SmartLight LTD. and titled "Dedicated Mammography Viewer", Israeli patent application serial number 116,244, filed Dec. 3, 1995, by applicant SmartLight and titled "Display Device", a corresponding U.S. Provisional application number 60/008,360, filed Dec. 7, 1995, of like title, PCT application PCT/EP95/04693, "Improved Display Device", filed Nov. 27, 1995, and published as WO96/17269, a corresponding U.S. Provisional Application number 60/007,522, of like title and filed on Nov. 24, 1995 and an Israeli patent application serial number 119,407, titled "Local Chromaticity Control" and filed by applicant "SmartLight", on Oct. 10, 1996, the disclosures of all of which are incorporated herein by reference.

Generally, it is desired to back-illuminate a transparency so that only the display surface behind the transparency is back-illuminated. A dense portion of the transparency is preferably back-illuminated with a higher intensity than other portions of the transparency. Preferably, when two tandem LCAs are used to mask the back-illumination, the LCA closer to the transparency operates in a low-resolution high contrast mode to provide very low light levels outside the transparency or region of interest and the LCA nearer the light source operates in a high-resolution mode to sharply delineate the transparency or regions of interest therein.

Alternatively, the transparency as a whole is viewed using dimmed back-illumination and a region of interest therein is viewed using higher intensity back-illumination. The high-resolution LCA masks the entire display surface and all of the transparency except for the region of interest, and the high contrast LCA masks the entire display surface outside the transparency. As a result, the back-illumination to the region of interest is not masker by any LCA, the back-illumination of the rest of the transparency is masked by only one LCA, so that it is dimly back-illuminated, and the back-illumination to the rest (uncovered portion) of the display surface is masked by two LCAs, so that it is very dark.

Typically, only one or two transparencies are viewed simultaneously. It has been found-that a high contrast can be obtained using by driving an LCA a 2×2 driving scheme, which is appropriate when only one transparency is displayed. In this case, a normally bright LCA is preferably used for the high-contrast LCA. 2×2 and 2×3 driving schemes also provide a high contrast. Such schemes are described in the above incorporated PCT publications and U.S. application.

In the present invention, when LCA 74 is incorporated in viewbox 60, LCA 74 is preferably normally bright and LCA 82 may be either normally bright or normally dark. Either LCA 74 or LCA 82 operates as the high contrast LCA, preferably LCA 82 is high resolution and LCA 74 is high contrast. Preferably, both functions, high-resolution and high-contrast, are accomplished using a single, preferably active matrix, LCA situated near light source 80, as described hereinabove and LCA 74 is omitted.

In the present invention, the contrast of LCA 82 is higher than in most prior art system. Furthermore, the beam-like nature of patterned light beam 81 enhances the effective contrast of LCAs 74 and 82 as opposed to some prior art systems, wherein the back-illumination is partially diffused. As a result, standard passive matrix driving and active matrix driving are also practical for transparency viewing.

Preferably, condenser optics 86 or an additional optical element shape the light beam to have a rectangular cross-section adapted to the aspect ratio of display surface 66.

Light source 80 is preferably a metal-halide lamp, such as a HQI-T 400w blue or a HQI-VG, manufactured by Osram GMbH or a Xenon lamp. Alternatively, other types of light sources, such as mercury vapor and incandescent lamps can be used. However, metal halide lamps have several advantages, especially as compared with fluorescent lamps.

First, the light output of metal-halide or xenon lamps is relatively stable over long periods of time and the life time of metal-halide lamps is generally long. Second, a wide range of custom and standard color spectra are available with metal-halide lamps, depending on the combination of metals used in the lamp. In some cases, a lamp whose color spectrum is generally similar to the color spectrum desired for light source 80 can be found or developed and the use of chromatic filter 90 can be avoided. Third, metal-halide lamps are relatively efficient, with up to 50% of their radiant output in the visible wave lengths. Fourth, metal-halide lamps require a smaller ballast per lumen output than fluorescent lamps. Fifth, metal-halide lamps are compact as compared to a fluorescent lamp, making them ideal for protections systems, which generally operate best with a point light source.

A shortcoming of metal-halide lamps is their sensitivity to their input voltage level. Thus, if a stable light output is desired, a voltage-regulated power supply is preferably used to supply voltage to the lamps.

Light source 80 may comprise more than one lamp to achieve higher light intensities or a better color spectrum.

It should be appreciated that cooling light source 80. Is filter 88 and projection subsystem 60 in general, is simpler than cooling a direct illumination viewbox of the prior art. In a direct illumination viewbox, the-heat is distributed over a large area, which is typically cooled by forced air. In preferred embodiments of the present invention, as described hereinabove, the heat is concentrated in very small portions of viewbox 60, which reach high temperatures. A flume type cooling system is preferably used, in which the heat radiated by light source 80 and IR filter 88 heats surrounding air. The heated air rises through a flume and is replaced by new, cooler air. This is similar to the cooling system used in other projectors.

In a preferred embodiment of the present invention, a sheet polarizer is not used for polarizer 94, since sheet polarizers are relatively inefficient at converting unpolarized light into polarized light. Instead, a low-loss polarizer, such as described above in conjunction with FIG. 1A or 1B is used for the polarization conversion. Alternatively, polarizer 94 is a retro-reflecting polarizer sheet, such as produced by 3M, and as described below. A shortcoming of most low-loss polarizers is their wavelength dependence. As a result, light transmitted from a low-loss polarizer is less polarized at some wavelengths compared to others. This unpolarized light can lower the contrast achievable with LCA 82. Accordingly, a linear polarizer is preferably placed between the low-loss polarizer and LCA 82. Thus linear polarizer is a "make sure" polarizer which only affects light which was not converted by the low-loss polarizer.

Since some wavelengths are more polarized than others by low-loss polarizers, the intensity of the polarized light will be wavelength dependent, which will cause a chromaticity error on display surface 66. This chromaticity error is preferably corrected using chromatic filter 90 or by selecting a light source 80 with a pre-corrected color spectrum.

Chromatic and IR filters, including narrowband rejection and narrowband transmission filters, are described in "Handbook of Optics", Volume I, edited by Michael Bass, published by McGraw-Hill Inc., NY.

An important advantage of using a projection subsystem, which projects light from a relatively small LCA, is the commercial availability of relatively inexpensive high-resolution high-contrast LCAs, such as active matrix LCAs. In a preferred embodiment of the invention, the back-illumination is masked using only one LCA, such as a Super Twist Nematic (STN) LCA. For example, Model No. G191D manufactured by TECD has a high contrast ratio, a resolution of 192×192 pixels and the ability to display many gray-levels. This type of LCA is generally not available in large sizes, such as 14"×17", which are required by direct back-illumination viewboxes.

In a preferred embodiment of the present invention, light recycling is practiced. Israel Patent application 114,258, titled "Transparency Viewing Apparatus", filed Jun. 21, 1995 and its corresponding U.S. provisional patent application 60/001,814, titled "Transparency Viewing Apparatus", to Dan Inbar, filed Aug. 1, 1995 and PCT publication WO95/16934, titled "A Self Masking Display Device", to Dan Inbar, Hannan Wolf and Zvi Netter, published Jun. 22, 1995, the disclosures of which are incorporated herein by reference, describe methods and apparatus to use light, which would otherwise be lost, to increase the intensity of the back-illumination of illuminated portions of display surface 66. Typically, only a relatively small portion of display surface 66 is illuminated, for example, when viewing a small transparency on a large viewbox or when viewing a small region of interest on a relatively large transparency. As a result, even if the efficiency of the recycling is low, such as 20%, the intensity increase over the viewed area can be high.

Figure 4A:
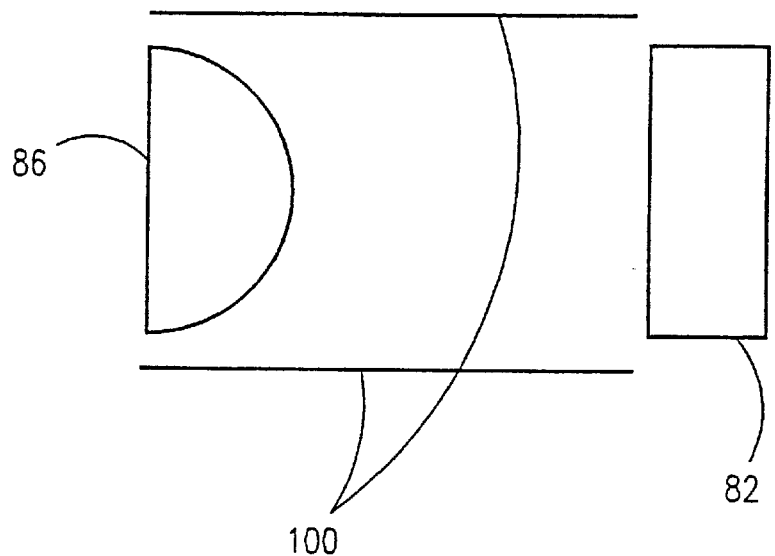
FIG. 4A and 4B are illustrations of light recycling systems according to preferred embodiments of the present invention.
Figure 4B:
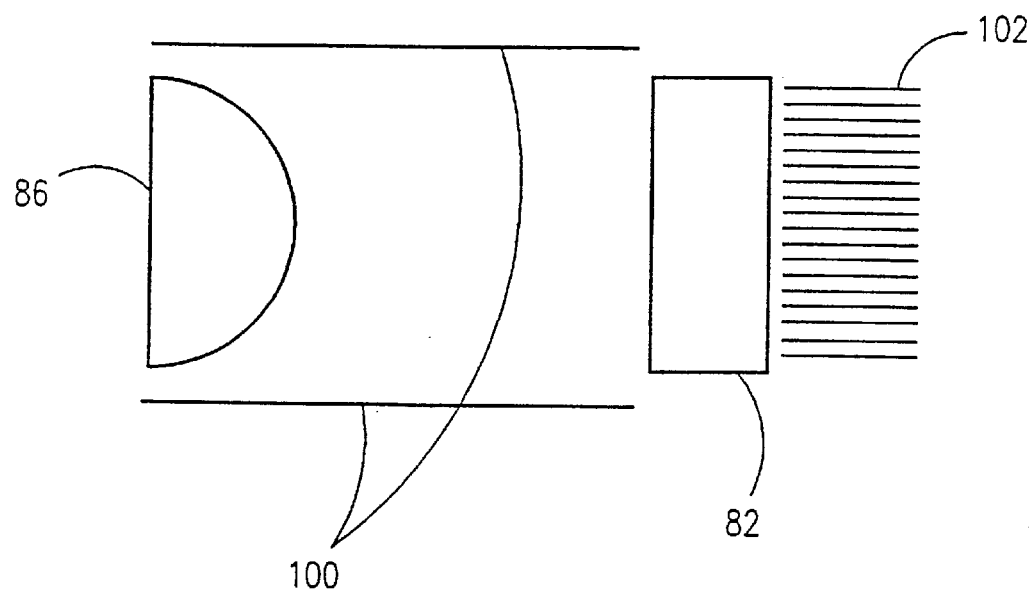

FIGS. 4A and 4B are illustrations of light recycling systems according to preferred embodiments of the invention. FIG 4A shows only condenser optics 86 and LCA 82 (from FIG. 3). Light reflected from LCA 82 is recycled by a plurality of reflectors 100 which reflect the light back towards LCA 82 or toward condenser optics 86. Alternatively or additionally, scattered light is recycled by a reflector, such as reflector 84 (shown in FIG. 3). Additionally or alternatively, projector 62 is encased in a casing having light reflecting inner surfaces to enhance light recycling.

In a preferred embodiment of the present invention, LCA 82 is a Polymer Dispersed Liquid Crystal Array (PDLCA), which selectably either transmits or scatters light in all directions. A PDLCA modulates both polarized and non-polarized light, so polarizer 94 and polarizer 96 are not required. A PDLCA is especially suitable for light recycling since very little light is absorbed by the LCA Itself, most of the non-transmitted light is scattered and, as such, can be collected and recycled.

In a projector using a PDLCA, a large amount of untransmitted light is scattered back to reflectors 100. Light reflected from reflectors 100 and light scattered forward from LCA 82 may be non-parallel to patterned light 81. As a result, the non-parallel light may be projected on portions of display surface 66 which are meant to be dark. FIG. 4B shows another preferred embodiment of the invention, in which a collimator 102 is placed on the exit face of LCA 82 to prevent scattered light, which passes through LCA 82, from lowering the contrast in patterned light 81.

Alternatively or additionally, light reflecting shutters are position between LC 82 and light source 80 to reflect light from masked portions of display surface 66 back toward back-reflector 84. The positioning of the shutters is preferably controlled by controller 70 to overlap darkened portions of LCA 82, but may also be maximally controlled.

In some known systems which use more than one LCA to modulate light for back-illumination, grid patterns are formed by light passing through the non-active spacings between LCA elements and are eliminated by a diffuser placed between the LCAs. In a preferred embodiment of the present invention, no diffuser is used. Instead, grid patterns and other aberrations formed in the pattern of light beam 81 are softened by the long distance between LCA 82 and display surface 66. This softening is achieved by the existence of slight aberrations in the optical lens and in LCA 82, which are amplified by the distance that patterned beam 81 transverses. Alternatively, back-projector 60 uses slightly out of focus optics to soften the pattern of light beam 81, while preserving a spatial resolution of approximately 3 to 10 mm.

It should be appreciated that patterns caused by non-active portions of active matrix LCAs are also corrected by the above described methods of beam softening.

Figure 5:
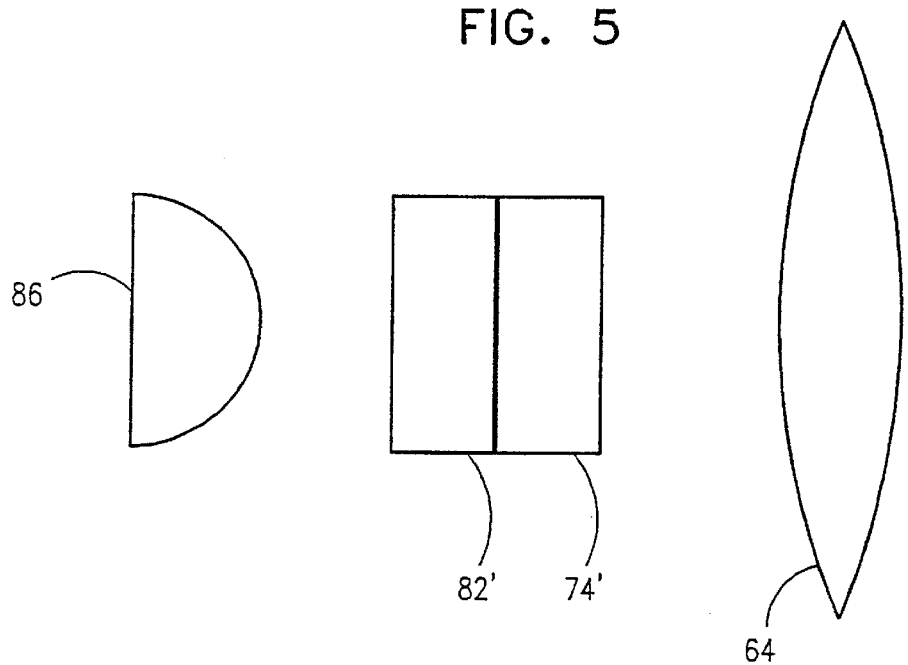
FIG. 5 is a schematic illustration of a projection subsystem for a viewbox according to a preferred embodiment of the invention having two LCAS.

FIGS. 2 and 3 show an embodiment of the present invention wherein one LCA (82) forms part of projection subsystem 62 and another LCA (74) is located near display surface 66. FIG. 5 is a schematic illustration of a portion of a projection subsystem of a viewbox having an LCA 82' and an LCA 74'. Preferably, LCA 82' and LCA 74' have substantially no gap between them. An advantage of having both LCA 82' and LCA 74' in the projection subsystem is their lower sensitivity to misalignment In addition, the distance between LCA 74' and display surface 66, has a softening effect on beam 81, which eliminates patterns caused by LCA 74', as described above.

Yet another advantage resulting from distancing display surface 66 from LCA 82 is the enlargement of the viewing angle. In some systems which use LCAs to mask back-illumination, the viewing angle is limited by the effective masking angle of the LCAs used. Thus, as the angle between a viewer and the normal to the LCA surface is increased, the contrast between back-illuminated portions of the display surface and non-back-illuminated portions is reduced. In contrast, preferred embodiments of the present invention have a much wider viewing angle due to heir geometry and the type of LCA used. In addition, some known systems use a BEP (Brightness Enhancement Film) to direct the back-illumination so that it is substantially perpendicular to the LCAs. As described herein, A BEF is generally not needed in the present invention, since the back-illumination is converted into a parallel beam by condenser optics 86. Thus, beam 81 is substantially perpendicular to LCA 82 then it passes therethrough, but not perpendicular to display surface 66, as a result of projection by optics 64.

Alternatively or Additionally, display surface 66 is a lecticular screen, as described in "Projection Displays", cited above, which intensifies the illumination in a narrow range of viewing angles. This gives brighter back-illuminating over a narrower viewing angle.

One problem with projectors is that the center of the display surface is closer to the light source than the edges of the display surface. Thus, there usually is a significant luminosity difference between the center of the display surface and its edges. In a preferred embodiment of the invention, a neutral density filter (not shown) is placed between condenser optics 86 and projection optics 64 to attenuate patterned beam 81 in a manner which corrects the luminance differences. Alternatively or additionally, controller 70 drives LCA 62 and/or LIC 74' using a pattern which corrects for the luminosity differences.

Preferably, the luminosity differences are determined during a calibration process during which the surface of viewbox 60 is imaged in one or more back-illumination states.

Alternatively, the luminosity differences are determined analytically and an appropriate filter produced. If the luminosity differences also include color differences, chromatic filter 90 corrects these color differences.

In order to achieve automatic operation of viewbox 60, such as automatic luminance correction and automatic masking of transparencies, a preferred embodiment of the present invention preferably uses an imaging camera or an optical sensor to image display surface 66. Aforementioned U.S. application serial No. 08/348,959, the aforementioned PCT publications WO91/10152, WO95/14949, and WO95/16934, Israel patent application 113,623, titled "Advanced Viewing Device", filed May 5, 1995, a U.S. provisional patent application 60/001,816, titled "Improved Display Device", filed Aug. 1, 1995, to Dan Inbar, Alex Hatanzon, Hanan Wolf, Ben Zion Levy and Eran Shaffir, Israel application 113,418, titled "Determination of Position of Transparency" or "Transparency Position Determination", filed Apr. 18, 1995 and a U.S. provisional patent application 60/001,811, titled "Transparency Position Determination", by Dan Inbar, Eran Shaffir, Hanan Wolf and Alex Natanzon, filed Aug. 1, 1995, the disclosures of which are incorporated herein by reference, disclose apparatus and methods for imaging a display surface of a viewbox with transparencies thereon and acting on the acquired data. Alternative automatic masking methods are described in Israel application 113,624, titled "Automatic Transparency Masking", filed May 5, 1995 and a like titled U.S. provisional patent application 60/001,819, to Dan Inbar, Hanan Wolf, Giora Teltsch and Eran Shaffir, filed Aug. 1, 1995, the disclosures of which are incorporated herein by reference.

Figure 6:
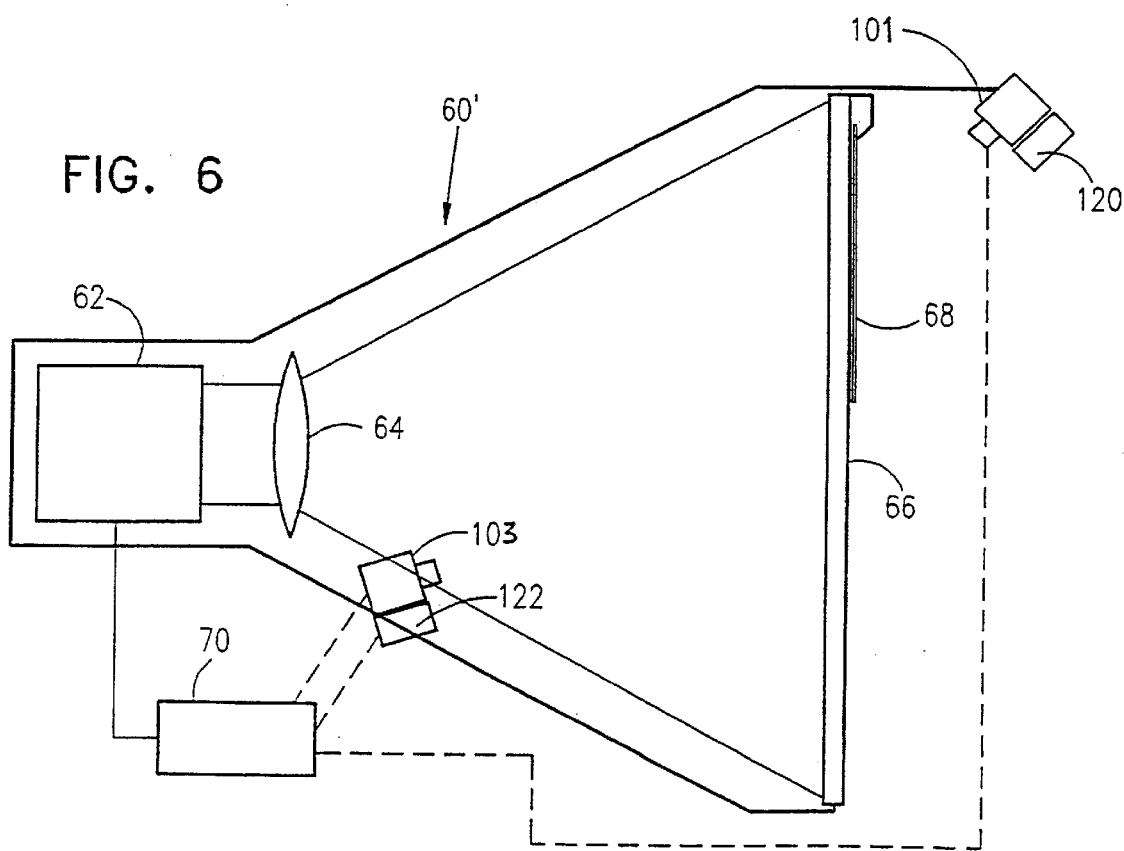
FIG. 6 shows two preferred locations for a camera which images transparencies placed on the viewbox according to a preferred embodiment of the present invention.

FIG. 6 shows two preferred locations for a camera according to two preferred embodiments of the present invention. In a first preferred embodiment a camera 101 is placed outside a viewbox 60', such that camera 101 can view display surface 66 in an unobstructed manner. Typically, display surface 66 is dark when no transparency is mounted thereon. Preferably, display surface 66 is continuously or momentarily illuminated by an IR light source when a new transparency 68 is placed thereon, so that camera 101 can view transparency 68. Preferably, the IR light source is mounted on camera 101 pointed at display surface 66. Alternatively, display surface 66, or a portion thereof, is momentarily back-illuminated at a low, non-dazzling, light level.

Alternatively or additionally, in a second preferred embodiment of the present invention, a camera 103 is placed inside viewbox 60', such that it views display surface 66 from the inside. Transparency 68 is back-illuminated (as seen by camera 103) by Ambient light, so that its location on display surface 66 is visible, especially when viewbox 60' has no LCA between camera 103 and display surface 66. Preferably, display 66 is coated on the inside with a non-reflective coating to enhance the visibility of the ambient light. Alternatively or additionally, camera 103 is fitted witch a spectral IR filter so that camera 103 only images IR light from an external (to viewbox 60) IR light source. Preferably, a non-directional ambient light source (not shown) supplies the IR illumination.

Alternatively, spectral gaps in the spectra of light source 80 (shown in FIG. 3) are exploited by camera 103. A narrowband transmission filter, fitted on camera 103, is designed to reject illumination arriving at the camera internally from system 60. Typically, the ambient illumination entering display surface 66 from outside viewbox 60 has sufficient intensity in the spectral gaps for imaging purposes. Alternatively, illumination in the spectral gaps is supplied by a special external light source outside viewbox 60.

Alternatively or additionally, temporal gaps in the illumination by light source 80 are utilized for imaging purposes by camera 103. Typically, the intensity of illumination from light source 80 varies as a function of the voltage supplied to light source 80. Camera 103 and the voltage supply are synchronized such that camera 103 acquires images of display surface 66 while light source 80 is temporarily dimmed for a very short period, e.g., several milliseconds.

Figure 7:
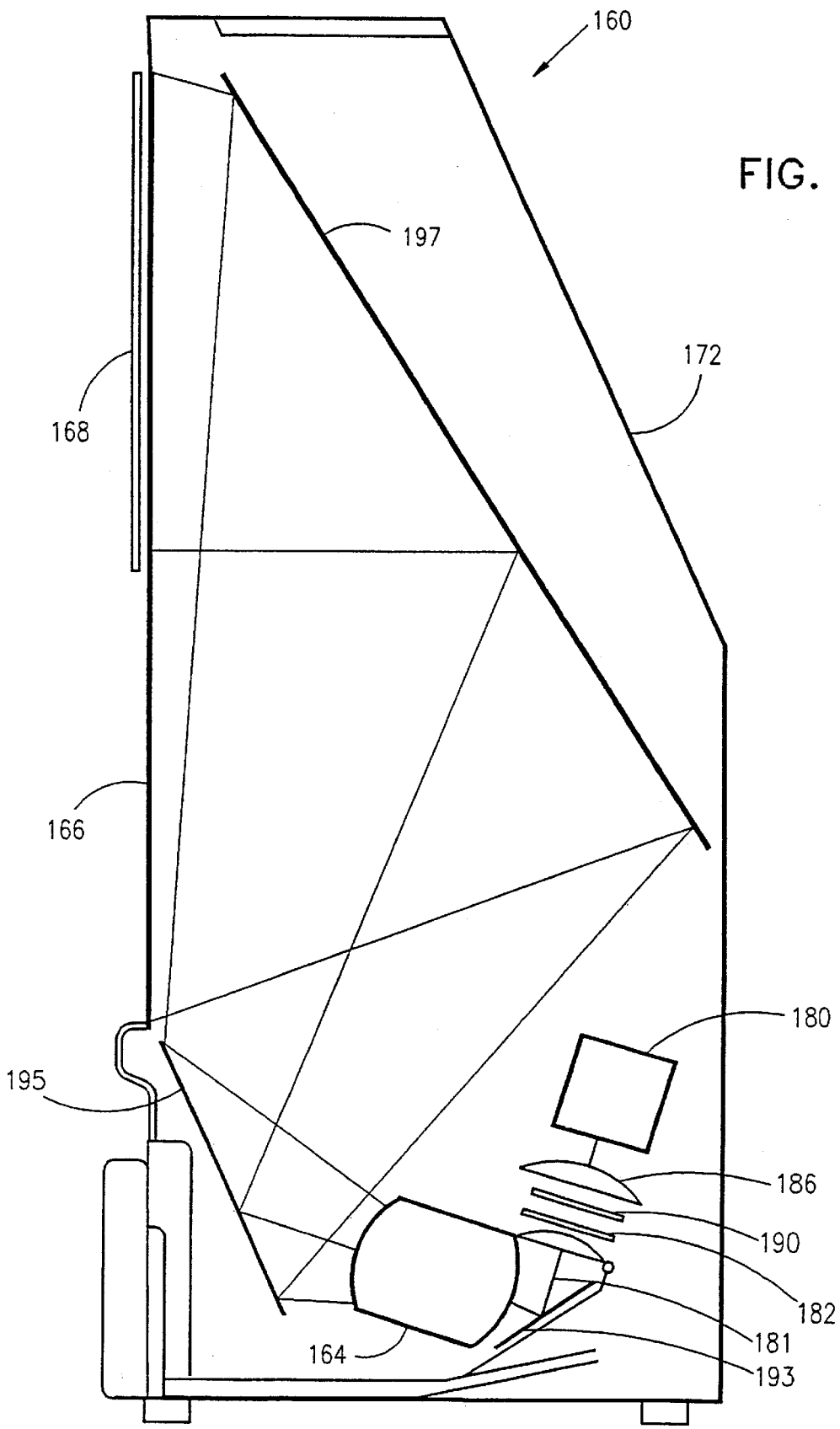
FIG. 7 shows a viewbox having a folded optical path according to a preferred embodiment of the invention.

FIG. 7 is a simplified schematic of viewbox 160 having a folder optical path, according to a preferred embodiment of the invention. The structure of viewbox 160 is generally similar to that of viewbox 60 shown in FIGS. 2 and 3. Condenser optics 186 converts light from a light source 180 into a parallel light beam. The color spectrum of the light beam is preferably corrected using a color correction filter 190 before or after the beam passes through an LCA 182 to form a patterned beam 181. Beam 181 is reflected off a first mirror 193 and projected by projection optics 164 towards a second mirror 195. Beam 181 is then reflected towards a third mirror 197, which reflects beam 181 to back-illuminate a display surface 166 having a transparency 168 mounted thereon. Viewbox 160 Is encased in a light-proof and light absorbing casing 172, excepting display surface 166. Preferably, a cooling system (not shown) cools the lower part of viewbox 160, which contains the heat producing elements. Alternatively, a flume cooling system as described hereinabove is used to cool viewbox 160.

An important advantage of using a folded optical path is that a large screen can be back-illuminated with its entire projector contained a relatively shallow viewbox, which does not take up a large amount of space. It should be noted that the projected pattern need not be exactly reproduced by the projection. For example, if the projected pattern is stretched in one dimension by the optical path, this does not affect the ability to project a desirable pattern; only the precise driving signals for the pattern generator need be changed. Further, since the pattern generator typically has a resolution much higher than the required mask resolution, the pattern generator may be driven at this higher resolution to correct many distortions which may be introduced by the optical path.

Figure 8:
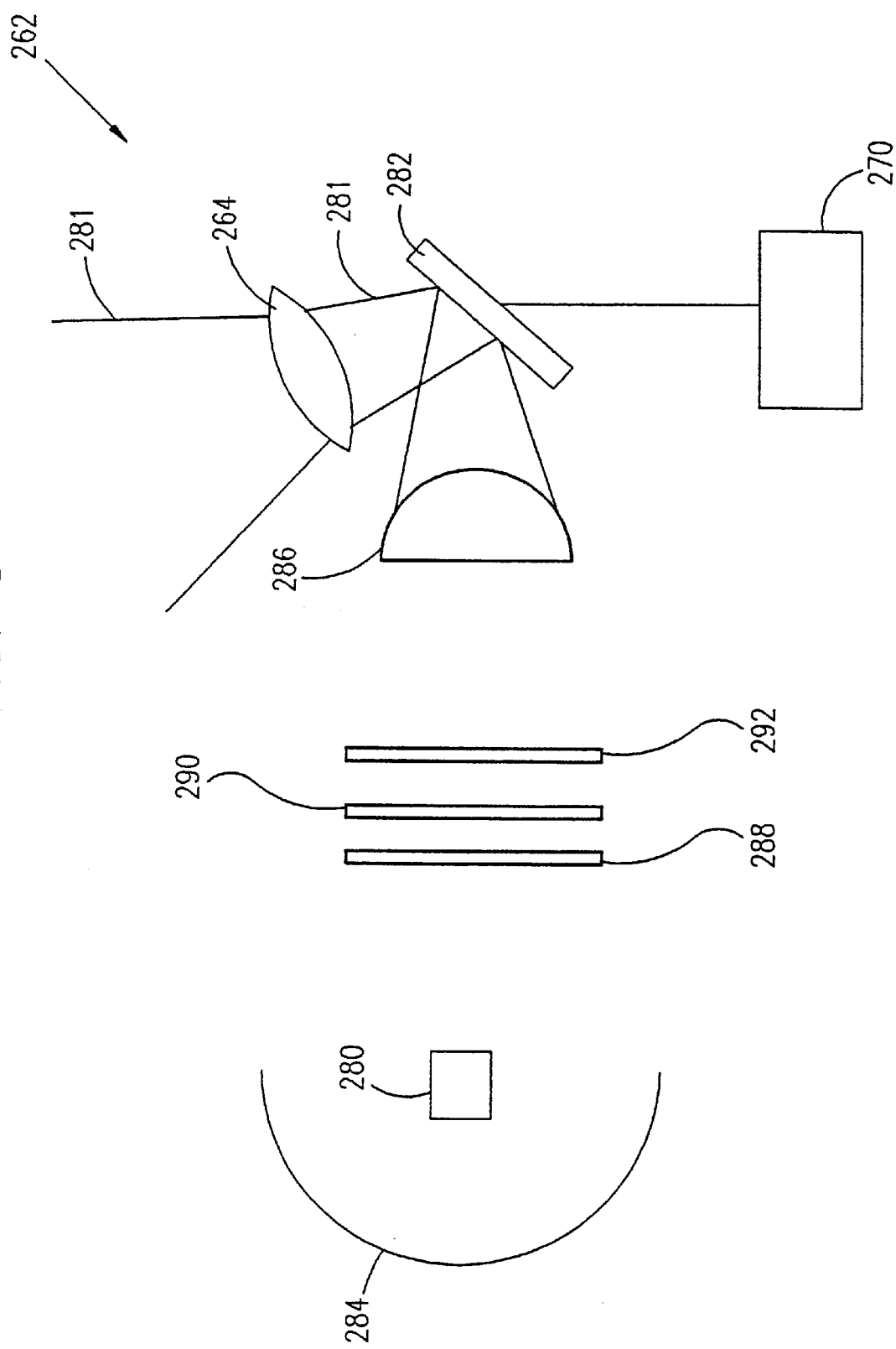
FIG. 8 shows a projection subsystem based on a DMD (digital micro-mirror device) according to another preferred embodiment of the present invention, suitable for the viewbox of FIG. 2.

FIG. 8 show a preferred embodiment of a projection subsystem 262 which is based on a DIM (digital micromirror device) 282. Light from a light source 280, which is preferably concentrated using a backreflector 284, is formed into 2 cone beam by condenser optics 286. The cone beam is reflected off DMD 282 to form a patterned beam 281. Projection optics 264 projects patterned beam 281 toward a display surface, such as display surface 66 (shown in FIG. 2). An IR filter 288, a chromatic filter 290 and an integrator 292 are preferably located in the light path between light source 280 and condenser optics 286, as described above with reference to FIG. 3.

DMD 282 is a solid state mirror device which is controlled by a controller 270 to reflect an incident cone beam to form the patterned beam 281. Portions of the cone beam which are not reflected Into bean 281 are typically reflected in a different direction. Preferably, a mirroring apparatus (not shown) collects and recycles the unused light from the cone beam and reflects it toward back-reflector 284.

DMDs and projectors incorporating DMDs are described in "The Design of High-Efficiency High-resolution Projectors with the Digital Micromirror Device", by H. C. Burstyn, D. Seyerhofer and P. M. Heyman and in "An Overview of the Performance Envelope of Digital-Micromirror-Device-Based Projection Display Systems", by J. B. Sampsell, both of which are published in the Digest of Technical Papers of the 1994 SID international symposium by the Society for Information Display, California and are incorporated herein by reference.

It should be appreciated that more efficient control of DMD 282 can be realized in an embodiment of the present invention as opposed to some known DMD image projectors. In most DMD projectors a design goal is the display of fast changing images. Thus, the micro-mirrors which comprise the DMD are constantly in motion and while in motion do not contribute to image intensity. In an embodiment of the present invention, the micro-mirrors are substantially static, and so, back-illumination is more intense.

In general, when using a back-projector, as in the present invention, the display surface size is mainly limited by the intensity of the light source and not by the price of the imaging components, whose size is not strongly dependent on the display size.

In a preferred embodiment of the present invention, shown in FIG. 6, the intensity and/or color of the back-illumination is sensed by a light sensor 120, preferably located outside viewbox 60, such as adjacent camera 101. Alternatively or additionally, a light sensor 122 is located inside viewbox 60', such as adjacent camera 103. Controller 70 controls the intensity of the back-illumination to compensate for variations in the intensity with time due, inter alia, to light recycling, warm-up of light source 80 or aging of light source 80. The intensity and/or color of the back-illumination are preferably controlled by changing the voltage of light source 80, by turning lamps in light source 80 on or off or by changing the density of the pattern used to drive LCA 82. Alternatively, non-optimal back-illumination conditions are reported to the operator.

It should be appreciated that other projectors known in the art can be used in some embodiments of the invention instead of an LCA projector. For example, an oil-film projector and a photo-electric projector. In addition other types of light-valves may be used instead of LCA or mirror light-valves, for example, mechanical shutters, ferro-electric light valves, reflection light valves such as photo-electric light valves, and other types of light valves.

Figure 9:
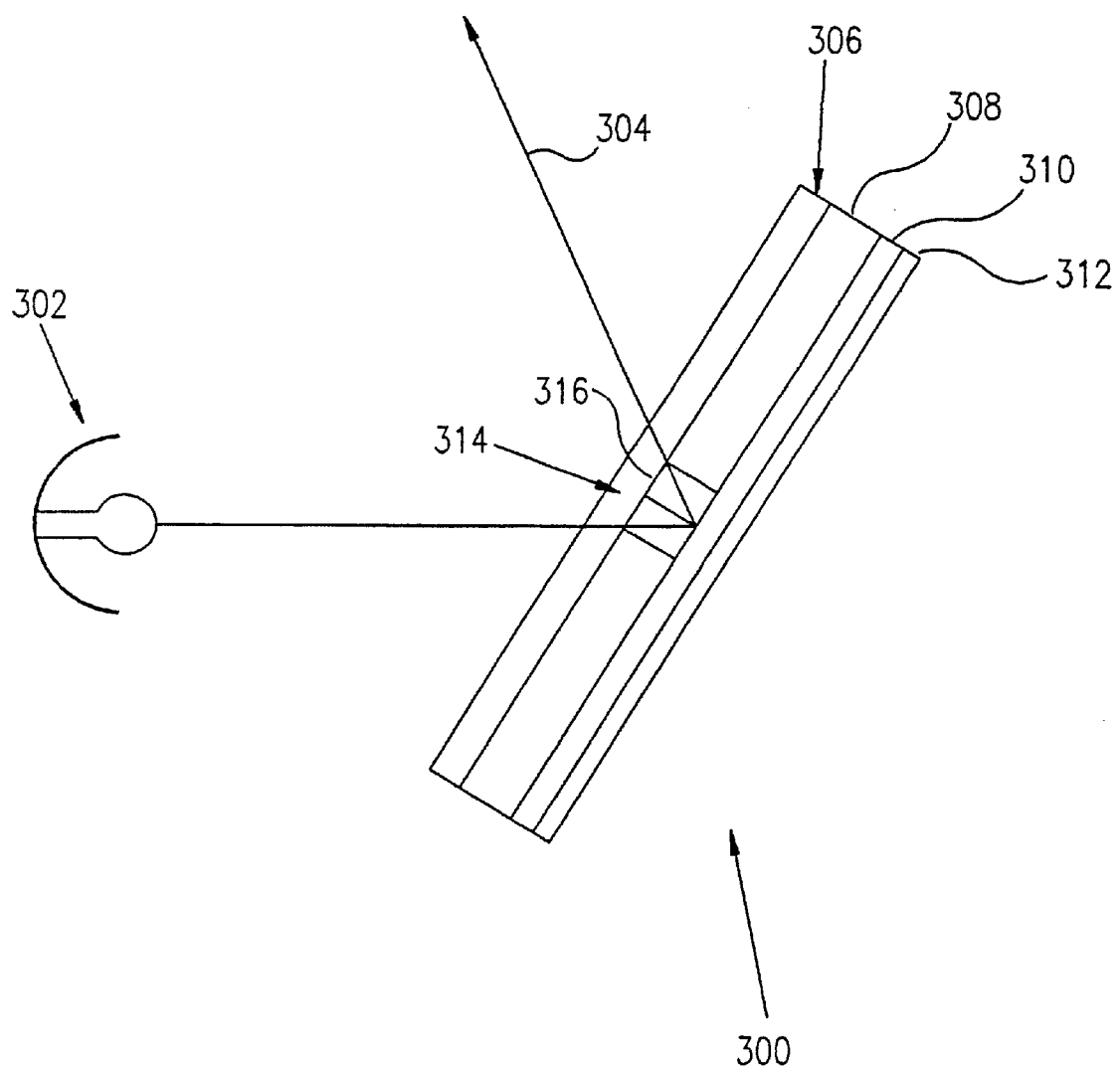
FIG. 9 shows a reflective LCA in accordance with a preferred embodiment of the present invention.

FIG. 9 shows a reflective LCA 300 in accordance with a preferred embodiment of the invention. Light 304 from a light source 302 is projected at LCA 300. A face polarizer 306 polarizes light 304, which passes through an LCA layer 308. LCA layer 308 is electrically controllable to rotate the polarization of incident light. Light 304 then passes through an exit polarizer 310 and is reflected by a mirror 312 back through polarizer 310, LCA layer 308 and polarizer 306 to a faceplate (not shown).

In a preferred embodiment of the invention, a low loss-polarizer (not shown) is disposed between light source 302 and polarizer 306, so as to minimize losses at polarizer 306. Preferably, the low-loss polarizer is a sheet polarizer. Preferably, the low-loss polarizer is a selective-reflectivity polarizer, such as a reflective cholesteric polarizer, for example as described in "High Performance Wide-Bandwidth Reflective Cholesteric Polarizers, by D. Coates, M. J. Goulding, S. Greenfield, J. M. W. Hanmer, S. A. Harden and O. L. Parri, in the SID '96 applications digest, pp. 67–70, the disclosure of which is incorporated herein by reference. Alternatively, the combined low-loss-polarizer is a 3M retroflecting sheet polarizer, for example as described in "Retroflecting Sheet Polarizer", by M. P. Weber, in the SID '93 digest, pp. 669–672, the disclosure of which is incorporated herein by reference.

In a reflecting-type polarizer, light which is not polarized parallel to the polarization of polarizer 306 is reflected back to light source 302.

Additionally or alternatively, polarizer 310 and mirror 312 are examined into a reflecting polarizer, which reflects light at one polarization and passes light at other polarizations. Light which passes through this combined polarizer/mirror is preferably recycled by a light guide or mirror system which redirects the light to face-polarizer 306. A 3M retroflective polarizer, at described in the previous paragraph is a preferred of type of a combined polarizer-mirror.

As can be appreciated, light 304 is not perpendicularly incident on LCA 300. Thus, some beams of light my enter LCA 300 at a pixel 314 and exit at a pixel 316. Unlike image projection systems, where such an occurrence could degrade image quality and may render such an LCA unsuitable for image projection, in a preferred embodiment of the invention, an overlap of 30% between neighboring pixels is preferred. More preferably, 50% overlap is desired. Optionally, 80% overlap or more is provided in a projection system in accordance with a preferred embodiment of the present invention.

In a preferred embodiment of the Invention, light source 302 comprises a fusion lamp, for example Solar 1000 lamp #383161 of Fusion Lighting Inc.

Figure 10:
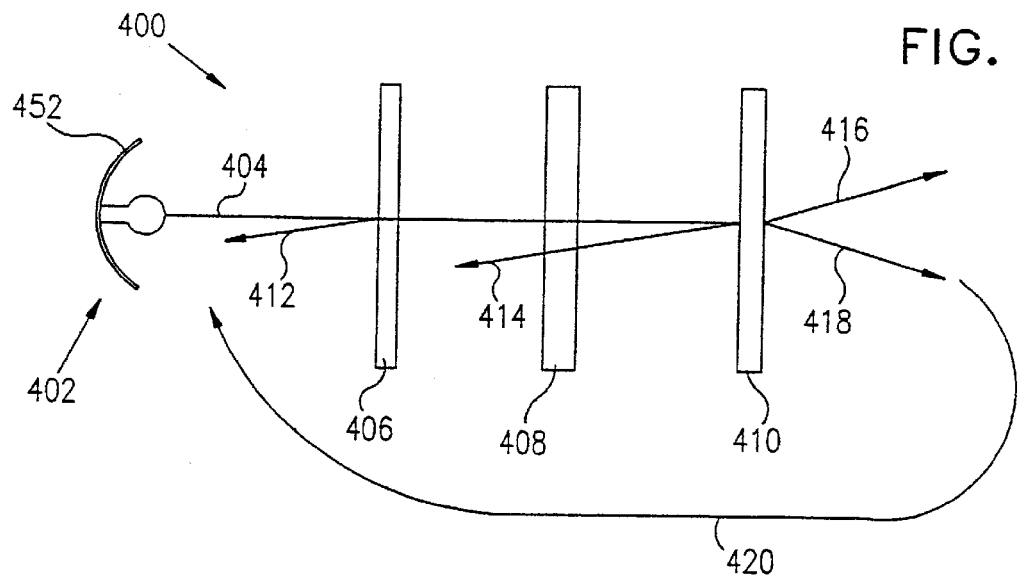
FIG. 10 is a schematic side-view of a light recycling viewbox using low-loss polarizers In accordance with preferred embodiments of the invention.

FIG. 10 is a schematic side-view of a light recycling viewbox 400 using low-loss polarizers in accordance with preferred embodiments of the invention. Viewbox 400 includes a light source 402, an input polarizer 406, an LCA 408 and an exit polarizer 410. In a first preferred embodiment of the invention, a light ray 404 is emitted by light source 402. Polarizer 406 is a reflective low-loss polarizer, such that light which is polarized in a first direction is transmitted through polarizer 406, while other light is reflected back to source 402, to be recycled. Preferably low-loss polarizer 406 includes a sheet polarizer which absorbs any light which passes through polarizer 406 even though it is not polarized in the first direction. An addressable LCA 408 selectively rotates the polarization of light ray 404, depending on a desirable a spatial masking pattern. Exit polarizer 410 only transmits light which is polarized in one direction, in accordance with the desired asking pattern; other light 414 is reflected back. Since reflected light 414 retraces its path through LCA 408, the polarization of light 414 after it re-exits LCA 408 is the same as the polarization of light 404 before it entered LCA 408. Thus, light 414 is not substantially absorbed by (the optional) linear polarizer in polarizer 406 and it may be recycled. Preferably, polarizer 406 is a prism system at described wit relation to FIGS. 1A and 1B.

In an alternative embodiment of the invention, exit polarizer 410 is a micro-prism system which transmits light of one polarization at a first angle, show in FIG. 10 as light 416, and light of other polarizations at a second angle, shown as light 418. Light 416 is used to back-illuminate a transparency with a spatial masking pattern, while light 418 is recycled by a recycling pat 420 (not shown in detail), which may use mirrors or smooth brightly painted surfaces. It should be appreciated that in the above two preferred embodiments of the invention, light which is not used in the masking pattern is recycled, even if it has already passed through an LCA and/or an input polarizer. This type of recycling is different from recycling of light whose polarization axis is not aligned with that of the input polarizer, which recycling of non-aligned polarized light is described wits reference to FIGS. 1A and 1B.

Figure 11:
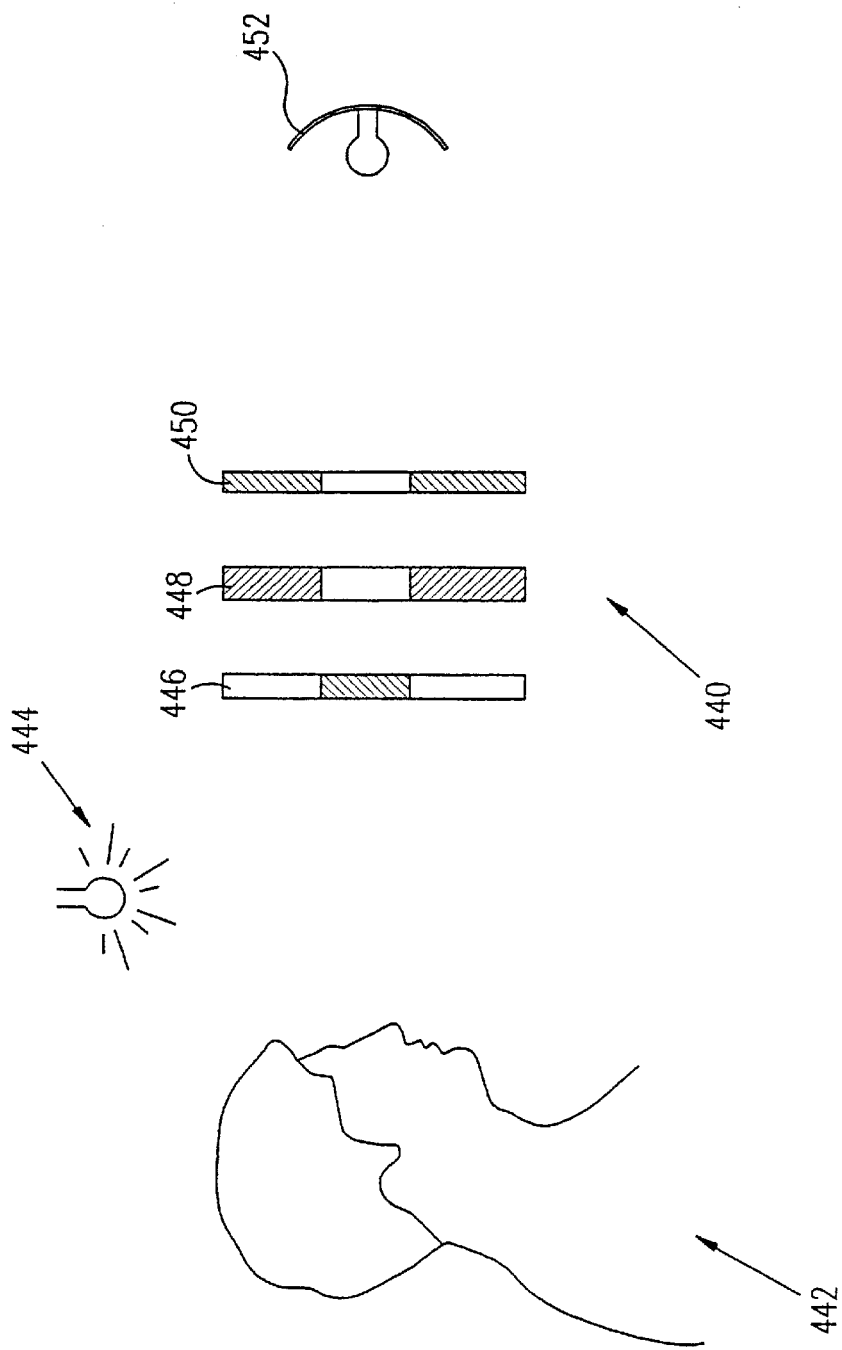
FIG. 11 is a schematic side view of a light-valve arrangement for a normally dark light-valve array in accordance with a preferred embodiment of the invention.

FIG. 11 is a schematic side view of a light-valve arrangement 440 for a normally dark light-valve array in accordance with a preferred embodiment of the invention. The use of normally dark light-valve arrays is sometimes problematic since, when such a light-valve is set to a transmitting mode, there may be dark non-transmitting lines in-between individual light-valves. In a preferred embodiment of the invention, list, from a back-illumination source 452 which is masked by a normally dark light valve array 448 is further masked by an addressable diffusing layer 446. Diffusing layer 446 is driven to diffuse light in the same portion of light-valve array 448 which transmits light from light source 452 and to be transparent over the dare portion of light-valve array 448. As a result, lines in-between individual elements of array 448 from the transmitting portion are not visible to an observer 442.

In addition, the contrast of arrangement 440 is enhanced as compared to an embodiment without diffuser 446, since ambient light from a light source 444 passes through transparent portion of diffuses 446 and is absorbed by dark portions of array 448, instead of being diffused back at observer 442, as would be the case if diffuser 446 were not addressable. Diffuser 446 is preferably driven to diffuse only enough so that artifacts from array 448 are not visible, since wasting of light from source 452 is not desirable. Preferably, a second addressable diffuser layer 450 or a reflective-type light valve, is located between array 448 and light source 452 and is driven to reflect light which would otherwise be absorbed by array 448 back to light source 452, where it may be recycled. In a preferred embodiment of the invention, array 448 is an SPD (suspended-particle device), which is theoretically capable of achieving a 1:1000 contrast, but which may have "normally dark" type artifacts. It should be appreciated that normally-dark light-valves have a better off-angle masking of light, due to their normally blocking behavior.

In a preferred embodiment of the invention the diffusing portion of diffuser 446 is made larger than the transmitting portion of array 448 to reduce light leakage caused by viewing parallax and/or to generate a soft masking effect.

Figure 12:
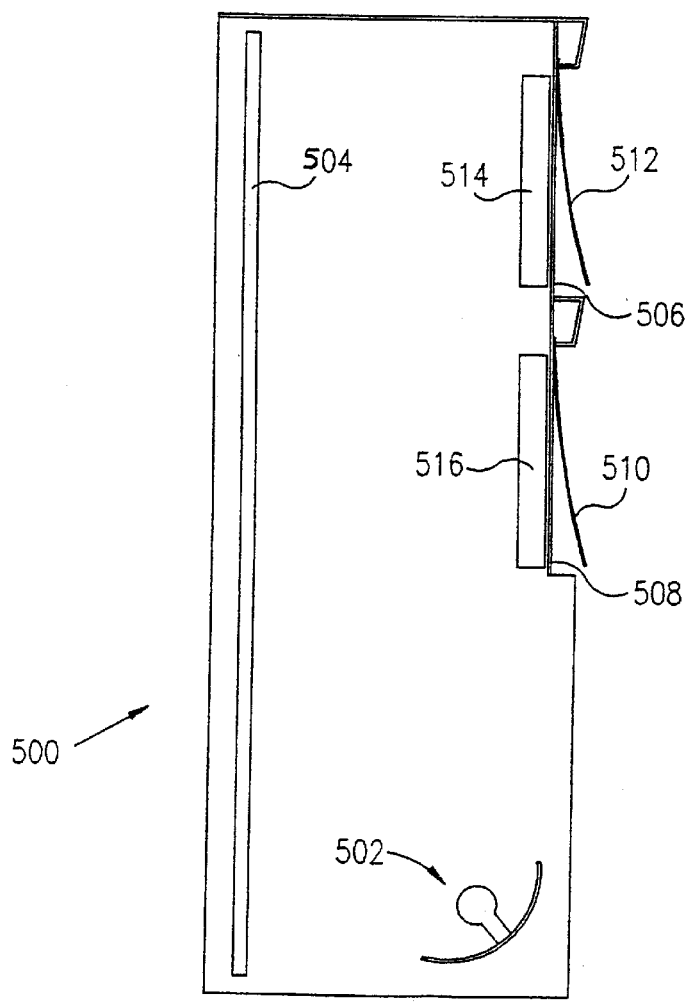
FIG. 12 is a schematic side view of a multi-faceplate viewbox having a single illumination source in accordance with a preferred embodiment of the invention.

FIG. 12 is a schematic side view of a multi-faceplate viewbox 500 having a single illumination source 502 and a reflector 504 in accordance with a preferred embodiment of the invention. In normal medical practice, several transparencies may be simultaneously placed on a single viewbox. Far example, in FIG. 12, a first transparency 512 is placed on a first viewing area 506 and a second transparency 510 is placed on a second viewing areas 508. In some cases, transparency 512 will have a higher density than transparency 510. As a result, transparency 512 will require stronger backillumination for proper viewing. However, such strong back-illumination may harm the viewing conditions for transparency 510.

In accordance with one embodiment of the present invention, multiple viewing areas of a single source illuminator are optimized for viewing. As described in the above incorporated applications, which described addressing schemes for LCAs, an improve, LCA contrast may be achieved in a passive LCA by grouping like-electrified electrodes into a small number of groups, each of which is equally electrified such that some are light transmitting and some not.

In a preferred embodiment of the invention, the electrification voltage levels of light transmitting areas for transparency 510 is reduced responsive to the density of transparency 512 so as to reduce the amount of light (i.e., glare) which Is transmitted through transparency 510. This is most easily achieved when masking for transparency 512 is generated by (at least) a first LCA 514 and masking for transparency 510 is generated by (at least) a second LCA 516. Alternatively, additional backillumination to one viewing area may be provided by an additional high intensity illumination source which back-illuminates each individual viewing area (LCA).

In an embodiment where the masking patterns are generated by projection of a light pattern or-patterns, even if a single pattern generator is used for both viewing areas, LCAs 514 and 516 may be used to vary the total amount of light passing through transparencies 510 and 512, In addition to and masking function they may have. Alternatively, LCAs 514 and 516 are addressed as single LCs. Alternatively, a variable attenuator is provided for at least one of areas 506 and 508.

Referring back to FIG. 2, when a backprojection system includes two LCAs, in a preferred embodiment of the invention, one of the LCAs is used as an image processing LCA, such as for unsharp masking and one of the LCAs is used for masking, as described hereinabove. Alternatively, a single LCA may be driven to provide both a masking function and an image processing function simultaneously. For example, an LCA may be driven to mask all of a faceplate except for an ROI and to perform unsharp masking or histogram equalization within the ROI. As can be appreciated, using a mask generator for both image processing and masking is not limited to backprojection systems, rather, any LCA based system can be driven in such a manner. For example, a two layer LCA based viewbox may be programmed to function in this manner. However, in a backprojection system, where an inexpensive active LCA may be used to provide artifact-free masking, it is easier to provide both masking and image processing functions in a single LCA.

It should be appreciated that the embodiments of the invention related to masking generate applicable a recycling are applicable also in direct viewing systems. However, it is expected that in projection Systems these embodiments may be practiced more efficiently.

It will be appreciated by a person skilled in the art that the invention is not limited by what has been described hereinabove. Rather, the scope of the invention is only limited by the claims which follow.

I claim:
1. A viewbox comprising:
   a faceplate adapted for mounting a transparency thereon;
   a light modulator comprising a plurality of light valves which modulates light to form a light pattern; and
   a projector which projects the modulated light pattern onto the back of the faceplate, such that the faceplate is back-lighted with a scaled version of the light pattern,
   wherein each light-valve of said plurality of light-valves corresponds to a pixel in the light pattern and wherein neighboring pixels have an overlap of at least 30%.
2. A viewbox according to claim 1, wherein said overlap is at least 50%.
3. A viewbox according to claim 1, wherein said overlap is at least 80%.
4. A viewbox according to claim 1, further comprising means for recycling light.

5. A viewbox according to claim 1, wherein the plurality of light valves comprise a reflective LCA.

6. A viewbox according to claim 1, comprising a plurality of light-valves in a layer between the projector and the faceplate which further modulates the projected light pattern.

7. A viewbox comprising:
- a faceplate adapted for mounting a transparency thereon;
- a light modulator comprising a plurality of light-valves which modulates light to form a light pattern, wherein each light-valve of said plurality of light-valves corresponds to a pixel in the light pattern and wherein neighboring pixels have an overlap of at least 30%; and
- a projector which back-projects the modulated light pattern of the faceplate, such that the faceplate is backlighted with a scaled version of the light pattern, wherein the plurality of light-valves comprise a reflective LCA.

8. A viewbox according to claim 7, wherein said overlap is at least 50%.

9. A viewbox according to claim 7, wherein said overlap is at least 80%.

10. A viewbox according to claim 7, wherein said plurality of light-valves comprise a low-loss polarizer which polarizes light entering said plurality of light-valves.

11. A viewbox according to claim 7, further comprising means for recycling light.

12. A viewbox according to claim 7, comprising a plurality of light-valves in a layer between the projector and the faceplate which further modulate the projected light pattern.

* * * * *